US007665019B2

(12) United States Patent
Jaeger

(10) Patent No.: US 7,665,019 B2
(45) Date of Patent: Feb. 16, 2010

(54) METHOD FOR RECORDING AND REPLAYING OPERATIONS IN A COMPUTER ENVIRONMENT USING INITIAL CONDITIONS

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 886 days.

(21) Appl. No.: 10/672,362

(22) Filed: Sep. 26, 2003

(65) Prior Publication Data

US 2005/0071760 A1 Mar. 31, 2005

(51) Int. Cl.
*G06F 3/048* (2006.01)
(52) U.S. Cl. ...................................... 715/704
(58) Field of Classification Search ................ 715/705, 715/709, 728, 734, 735, 736, 771, 704
See application file for complete search history.

(56) References Cited

U.S. PATENT DOCUMENTS 6,424,357 B1 * 7/2002 Frulla et al. ................. 715/728
6,667,751 B1 12/2003 Wynn et al.

* cited by examiner

*Primary Examiner*—Thanh T. Vu

(57) ABSTRACT

A method for recording and replaying operations in a computer environment utilizes initial conditions of the computer environment at the start of a recording to configure a replay computer environment during replay. The initial conditions of the computer environment are saved prior to recording of user inputs to the computer environment. The saved initial conditions and the recorded user inputs can then be used to actively operate the replay computer environment from a state substantially identical to the initial state of the computer environment to replay the recorded operations in the replay computer environment. The replay computer environment may be a copy of a current computer environment from which a replay of the recorded operations has been initiated.

27 Claims, 24 Drawing Sheets

Figure 6

This is text in a document like a help or business document or a letter or anything that contains text. This is text in a document like a help or business document or a letter or anything that contains text.

8a ——  Event recording #1

This is text in a document like a help or business document or a letter or anything that contains text.

8b ——  Event recording #2

This is text in a document like a help or business document or a letter or anything that contains text.

8c ——  Event recording #3

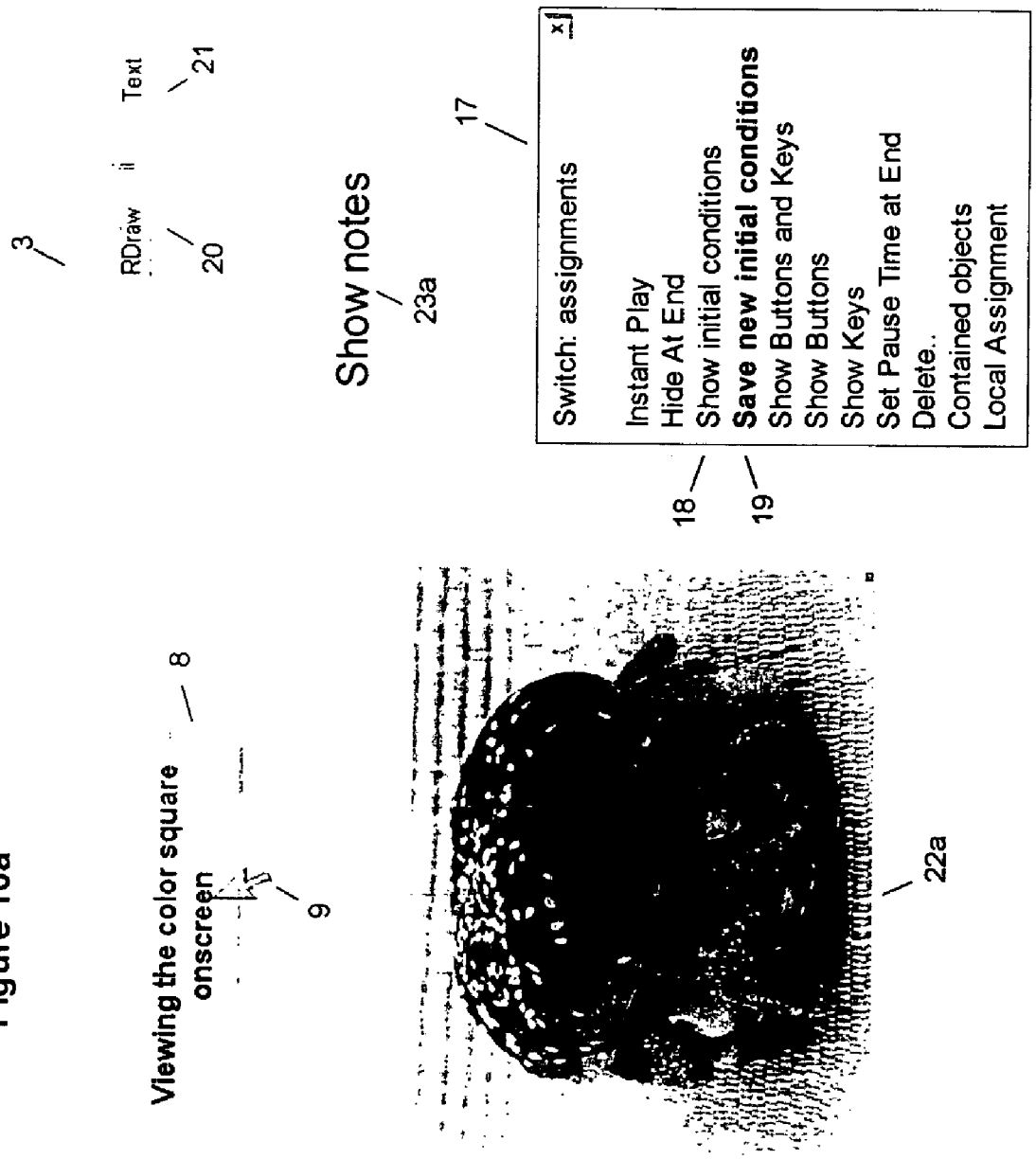

METHOD FOR RECORDING AND REPLAYING OPERATIONS IN A COMPUTER ENVIRONMENT USING INITIAL CONDITIONS

FIELD OF THE INVENTION

The invention relates generally to computer programs, and more particularly to a method for recording and replaying operations in a computer environment.

BACKGROUND OF THE INVENTION

Help systems have existed for at least as long as personal computers. The main purpose of such help systems is to provide information that aids computer users in their effort to understand the operation of a particular software program or operating system. Originally, this help came in the form of printed documentation. There was the additional option of verbal support through telephone help desks and customer training, both provided by the application developer at substantial additional cost to the customer. Today, most help systems are constructed from electronic documents that have extensive search facilities and hyper-link facilities to simplify navigation. However, these help systems still prove frustrating for users. Hence, there is continued need for telephone support, third party textbooks and training courses. In addition, these help systems are usually implemented as separate applications with little or no direct relation to the application on which the help systems are providing help.

As stated above, conventional help systems generally provide search facilities, which allow a user to retrieve information pertaining to a desired topic of a software program. This can take many forms, such as clicking on a word or phrase in an index, typing a word, phrase or sentence into a search window, or inputting a verbal command via a microphone connected to a computer.

In each case, the result of the help search is usually in the form of text and diagrams, which may illustrate an operational process for performing a certain task in the respective computer program. These text and diagrams exist as static media, which has been created by a software program to be viewed by a user.

In more ambitious help systems, videos and/or slideshows are implemented to illustrate an operational process of a computer program. These videos and slideshows can comprise screen captures as the computer program is being operated to perform a particular task. The videos and/or slideshows can then be played back at a suitable frame rate so that a user can view the operational process. However, these media are still "static" in the sense that the media exist as finished pieces of media that a user views, e.g., for instructional purposes. Such static media is a not a result of an active software being operated in real time, but rather is a result of the software being used to create the static media to illustrate an operational process.

A concern with conventional help systems is that the static media provided by the help system do not allow a user to interact with the computer program being presented in the static media. Thus, the user has to switch between the static media and an active computer program to personally perform or repeat one or more steps of the operational process illustrated in the static media. In addition, the user must perform all the previous steps to get to a desired step of the illustrated operational process, which may be near the end of the process. Furthermore, if the user has been working on the active computer program, using this computer program to perform or repeat one or more steps of the illustrated operational process may result in a loss of existing work product on the computer program.

In view of this concern, what is needed is a method for recording and replaying operations in a computer program that allows a user to interact with the computer program as recorded operations are being replayed.

SUMMARY OF THE INVENTION

A method for recording and replaying operations in a computer environment utilizes initial conditions of the computer environment at the start of a recording to configure a replay computer environment during replay. The initial conditions of the computer environment are saved prior to recording of user inputs to the computer environment. The saved initial conditions and the recorded user inputs can then be used to actively operate the replay computer environment from a state substantially identical to the initial state of the computer environment to replay the recorded operations in the replay computer environment. The replay computer environment may be a copy of a current computer environment from which a replay of the recorded operations has been initiated.

A method for recording operations in a computer environment in accordance with an embodiment of the invention includes saving initial conditions of the computer environment, the initial conditions corresponding to an initial state of the computer environment, and recording user inputs to the computer environment to produce a recorded session of the operations in the computer environment.

A method for replaying recorded computer operations in accordance with an embodiment of the invention includes loading recorded initial conditions of a recorded computer environment into a replay computer environment such that the state of the replay computer environment is substantially equivalent to an initial state of the recorded computer environment when the recorded computer operations were recorded, and applying recorded user inputs to the replay computer environment to actively operate the replay computer environment as a replay of the recorded computer operations.

An embodiment of the invention includes a storage medium, readable by a computer, tangibly embodying a program of instructions executable by the computer to perform method steps for recording and replaying operations in a computer environment.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 6 is an electronic document with embedded event replay switches.

FIGS. 10a and 10b depicts a second method of editing initial conditions.

DETAILED DESCRIPTION

Figure 1:
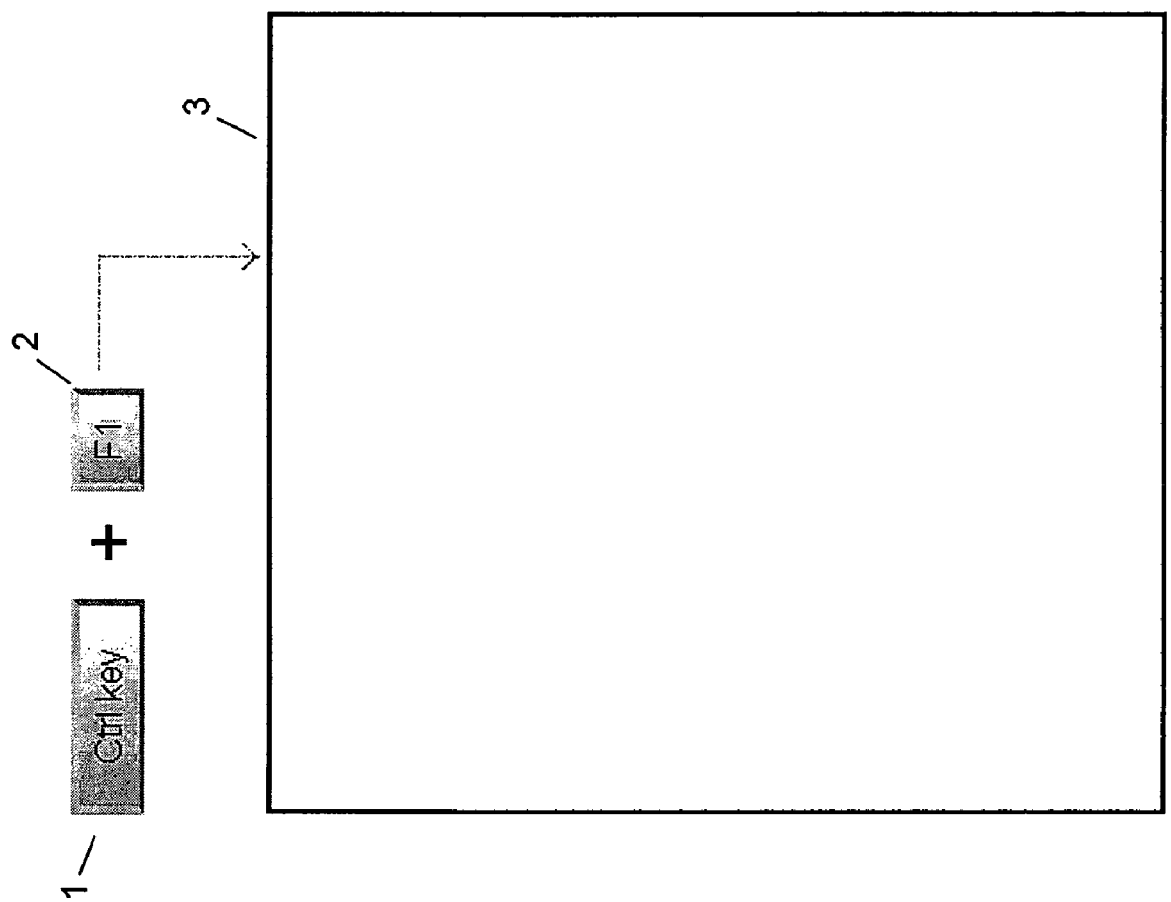
FIG. 1 depicts creating an event recording.

The following are descriptions of terms used in this disclosure:

Events—An event is a single user input to a computer operating environment created by a computer program. User inputs include mouse button presses, mouse button releases, mouse drags (positional changes of a cursor) and keyboard strokes.

Initial Conditions—A set of initial conditions is a snapshot of the initial system state of a computer operating environment at the time an event recording was started. A set of initial conditions includes sufficient information to recreate the initial system state of the computer operating environment either in the same computer operating environment or in another computer operation environment.

Event Recording—An event recording is the recorded events in the computer operating environment during a single recording pass, including the initial conditions when the recording was initiated. Event recording includes all user inputs from the time when the recording was started to the time when the recording was stopped. An event session is equivalent to an event recording, and both are used herein interchangeably.

An event recorder for recording and replaying operations in a computer operating environment in accordance with an exemplary embodiment of the invention records not only user inputs to the computer operating environment, but also records the initial conditions, i.e., the initial system state, of the computer operating environment at the time of the recording. Since the initial conditions depend on the initial system state of the computer operating environment, a user can modify the initial conditions by changing the system state prior to the recording. As described below, a user can also modify the initial conditions after the initial conditions have been recorded or saved. During replay, the event recorder recreates the recorded initial conditions in a new computer operating environment or in the same computer operating environment and then operates this computer operating environment using the recorded user inputs. Thus, the recorded operations in the original computer operating environment can be duplicated in this replay computer operating environment.

As described in more detail below, the event recorder allows a user to pause or stop the replaying of the recorded computer operations in the replay computer operating environment and interact with the replay computer operating environment in the current system state. Thus, the event recorder can be used at least in part for the following purposes: as an interactive instructional and communication process, as a dynamic help system, and as a process for documenting bugs in software or a computer program. In the exemplary embodiment, the event recorder is integrated with a computer program that can create the computer operating environment to be recorded. Thus, the event recorder in accordance with the invention operates as part of the underlying computer program.

In the exemplary embodiment, the event recorder records user inputs in a computer file called the "event session file." The replaying of user inputs, as contained in this file, enables users to view the actual operation of a computer program itself as interactive instructional and communication media. The replay of an event session file is always preceded by the restoration of the system state to that which it was in at the time the session was recorded. The restoration of the system state is achieved by loading another computer file called the "initial conditions file", which includes the initial conditions of the computer operating environment at the beginning of the recording. The initial conditions file enables recording, and hence replay, to commence with the system in any state, not just from a predetermined, hard-coded default state.

By this manner the computer program itself can function as an immediate method of communication whereby the user can record and playback any action or operation which the user performs with the computer program using user inputs defined by a set of initial conditions.

In addition, this computer program can function as a dynamic help system. The operation of the computer program itself becomes the dynamic help system. The computer program is not used to produce video or graphic media that is viewed by a user as an instructional aid. Instead, the computer program is used to record its own operations and is then used to play back these operations in real time just as the operations were performed by the user at the time the operations were recorded. The resulting system operations are dependent on the initial conditions, which are saved in an initial conditions file in addition to the saved user inputs.

Furthermore, the computer program can be effectively used to illustrate bugs in the computer program itself. Typically when bugs are found in software, a step-by-step report is generated that describes in detail how to recreate the bug. With the event recorder in accordance with the invention, a user can create an event recording that operates the very software that is being debugged when the event recording is replayed. As the event recording is replayed in the software, the bug can be not only seen, but analyzed using the software itself. This eliminates any potential confusion about what state the system was in prior to the error and what the user did to observe the error.

The event recorder in accordance with the invention is described herein as being used with a computer program called the "Blackspace" program. The word "Blackspace" is a trademark of the NBOR Corporation. The Blackspace program creates a computer operating environment referred to herein as "Blackspace" environment. Blackspace environment presents one universal drawing surface that is shared by all graphic objects within the environment. Blackspace environment is analogous to a giant drawing "canvas" on which all graphic objects generated in the environment exist and can be applied. Each of these graphic objects can have a user-created relationship to any or all the other objects. There are no barriers between any of the objects that are created for or exist on this Blackspace canvas. However, the event recorder in accordance with the invention is not limited to the Blackspace environment and may be implemented in any computer operating environment.

There are two layers or elements that make up the event recorder on its most basic level:

(1) The first layer is a general tool that allows a user to record and replay user inputs to the system. This records and replays mouse moves, mouse button presses and keyboard strokes ("user inputs"), and references these user inputs to a set of initial conditions.

(2) The second layer, which can serve as a dynamic help system, gives the user not only static instructions about what to do, but it actually shows the behavior of the system where those instructions are carried out. It uses the real system to show those functions to a user and then allows the user to perform the same tasks that were just shown to the user in the replay of the event recording.

Since the event recorder uses the real system program to demonstrate its own code, the user can stop or interrupt the replay of an event session at any time and take over and personally try things using the actual code without having to enter any program or create any special environment. The conditions during replay are real and thereby become a workplace for the user viewing any particular help in the dynamic help system. Users can then create their own experiments and build on the learning that they gain from this process. Users can try variations on what they have just seen demonstrated in the dynamic help system. Thus, the dynamic help system is a very interactive learning environment. Unlike a video or other static media, what a user views during a replay of an event session are the actual operations in a real Blackspace environment, not just captured screen shots of the Blackspace environment being operated.

As stated above, the playback of an event session is the computer program operating itself in real time to illustrate an operational process. Thus, an event session can be viewed as a media that can be played. However, the use of the word "media" with reference to an event session is not really media at all in the classical sense of the word. The "media" aspect of an event session is the computer program operating itself. User actions or inputs are saved and referenced to a set of initial conditions which govern the result of these user inputs as the user inputs are played back in real time. This process enables users to easily and quickly create simple or complex illustrations of any valid operation that can be performed with the computer program.

Unlike a video media, screen capture, or the like which is a recording of images playing back at a set frame rate, an event recording is the computer program in action. Therefore, the computer program is always fully active as it is the action of the computer program that is the replaying of an event session. The images that are viewed during the playback of an event session are the computer program itself being operated by the computer program. There are no recordings here in the sense of a video, slide show or the like.

The event recorder enables a user to invoke the action of memorizing mouse button presses, mouse button releases, mouse moves or drags and keyboard strokes ("user inputs") with reference to a set of initial conditions. This set of initial condition controls the result that is obtained from the user inputs. Without an initial conditions file that contains the recorded initial conditions, these recorded user inputs would have no predictable result. Each time an event session is replayed, the results would be unpredictable, even though the recorded user inputs remained the same. This is because during the record pass, the user performs operations on the objects visible in the Blackspace environment. Mouse button clicks and keystrokes are delivered to specific objects in specific locations in the Blackspace environment. Without the initial conditions file there is no way to ensure that the mouse button clicks are delivered to their intended target, or that the target even exists. An exception to this is when the recording begins with a blank Blackspace environment. However, such a recording then requires the user to not only record the operation the user wishes to demonstrate but also the creation of those objects used in the demonstration and all operations necessary to move them into the correct state for the demonstration.

The event recorder in accordance with the invention is described further below with reference to the following topics:

1. Viewer.
2. Initial conditions.
3. Embedding of event sessions in normal working documents.
4. Editing initial conditions and operations (i.e., editing parts of event sessions).
5. The event recording is the real computer program operating on itself.

1. The Viewer.

The viewer is a separate copy of the Blackspace program, which is an identical copy of the user's normal working environment. Thus, the viewer provides another computer operating environment, i.e., another Blackspace environment. In fact, the viewer runs from the same executable file on the computer's hard drive. But the viewer provides a user with a safe and separate environment in which to learn the system (the Blackspace program) and try out new ideas and in which to experiment without corrupting their normal work.

There are two modes for replaying an event session, the internal mode and the viewer mode. In the internal mode, an event session is replayed in the same Blackspace environment in which a user is requesting the replay. This is destructive replay. Loading the initial conditions to replay an event session replaces the current state of the Blackspace environment. In the viewer mode, an event session is replayed in another Blackspace environment, which is provided by the computer program. When replay is requested, a second copy of the application is launched (the viewer). The event session is automatically started in the viewer, without affecting the users work in the main application, the original Blackspace environment from which replay was requested. When replay is finished, the viewer automatically provides the user with an option, e.g., a button or switch, to return to the main application. Alternatively, the user can swap back using a taskbar provided by the operating system of the computer.

To enable the viewer, a user would do the following:

A. Create an event session. FIG. 1 shows this process of creating an event session. In the exemplary embodiment, the recording process is started when the control key 1 or its equivalent is pressed and held down, and then the F1 key 2 (or its equivalent) is pressed. Then anything that a user creates (that is supported by the computer program, e.g., Blackspace program) will be recorded as an event session in the Blackspace environment 3. The recording is stopped when the Ctrl key 1 is again pressed and held down, and then the F1 key 2 is again pressed.

Figure 2:
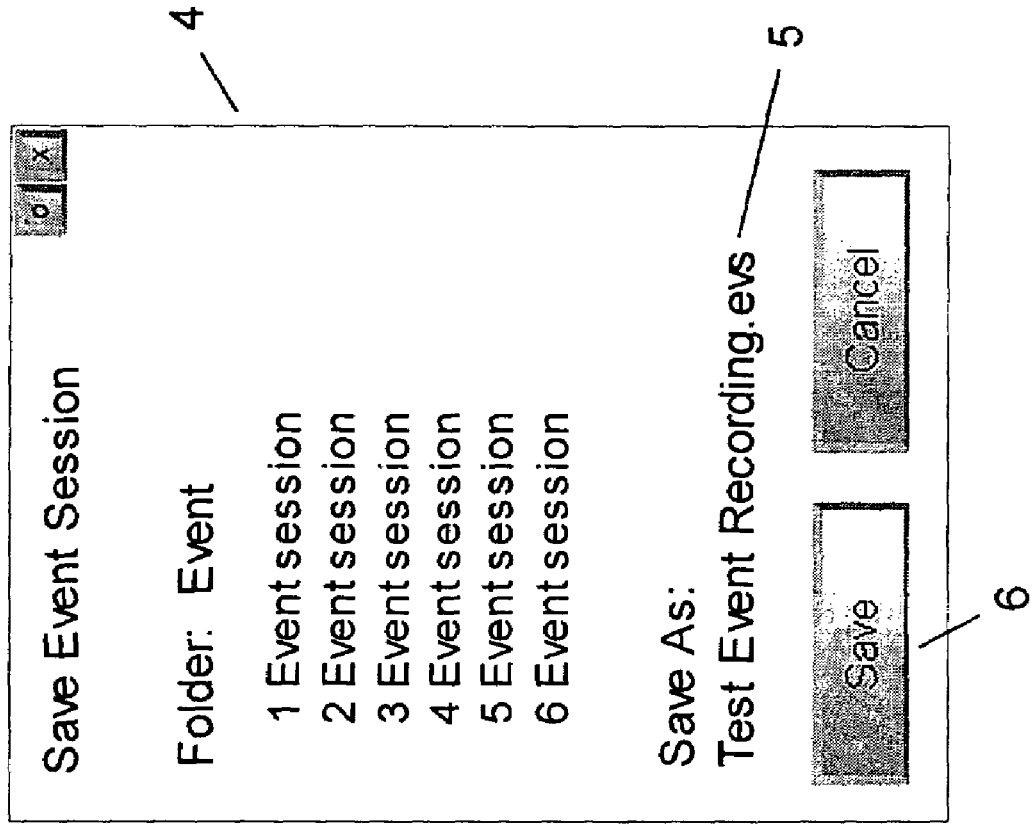
FIG. 2 depicts saving an event recording.

As illustrated in FIG. 2, when the recording is stopped, an event browser 4 appears. Then a user can type the desired name of the recorded event session 5 into the browser 4 and then press the save switch 6. This saves the event recording with a user inputted name 5.

Figure 3:
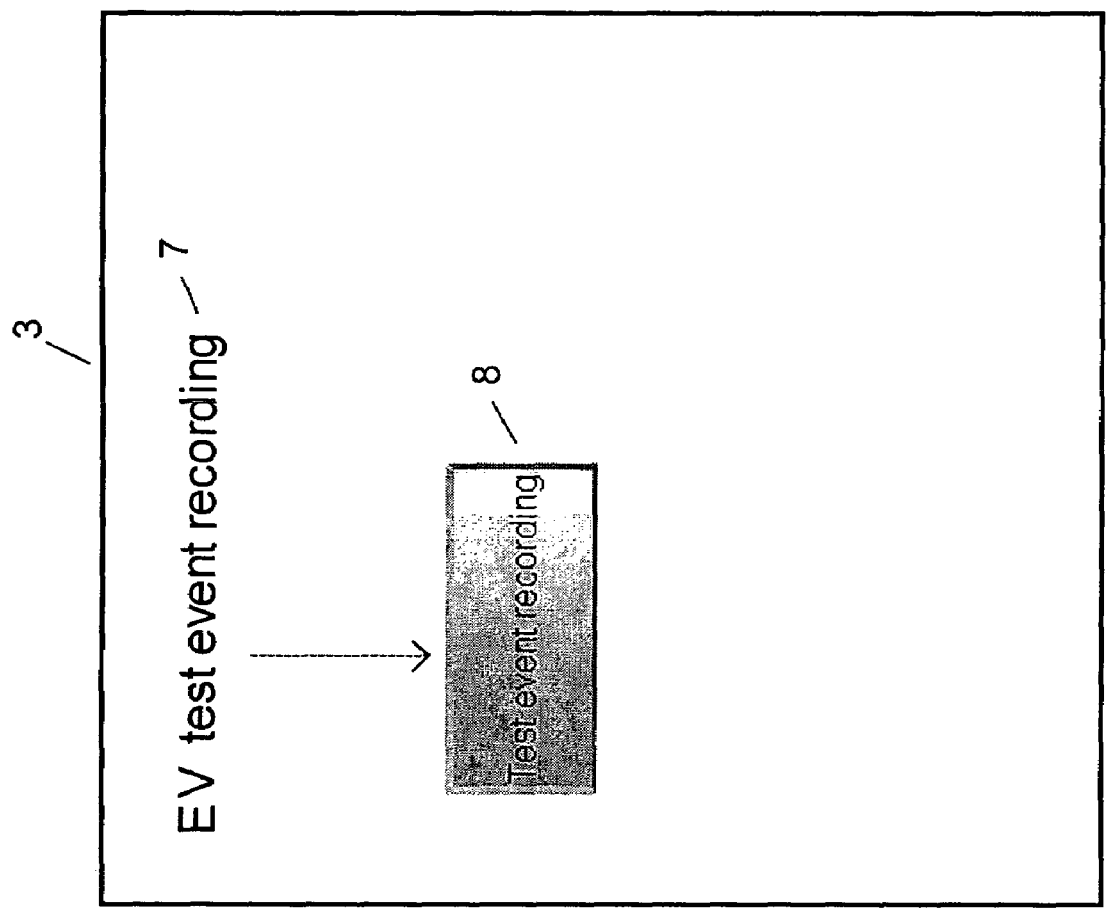
FIG. 3 depicts recalling an event recording using a specifier.

B. Recall this recorded event session, which will cause this event session to be embedded onto a switch. One method of recalling a recorded event session is to use a Specifier. FIG. 3 shows this process of recalling a recorded event session using a Specifier. A Specifier is a letter or group of letters or phrase (which could include numbers, graphics, pictures and the like) that can be user inputted onscreen to cause an action to occur. One such action is the recalling of sound files, picture files, data files, video files, etc., to the Blackspace environment. Typically, a Specifier is typed, drawn or verbally stated. This is followed by the specific name of the item that is desired to be brought onscreen. Alternately, a user can input a Specifier and simply activate the Escape key, Enter key or any appropriate command and this will bring a browser for the type of information required by the Specifier that was inputted. The user can then make a selection in this browser to bring a desired item to the Blackspace environment or to some other type of computer environment.

As illustrated in FIG. 3, when such a Specifier (in this case "EV") followed by the name of a recorded event session that is desired to be recalled, e.g., "test event recording" event session 7, is inputted, the computer program automatically creates an event replay switch 8, which is a graphic control device, and assigns the recalled event session to that switch. Upon the completion of the assignment, which is essentially immediate, the name of the selected event session 7 appears as the label for the switch 8.

Figure 4:
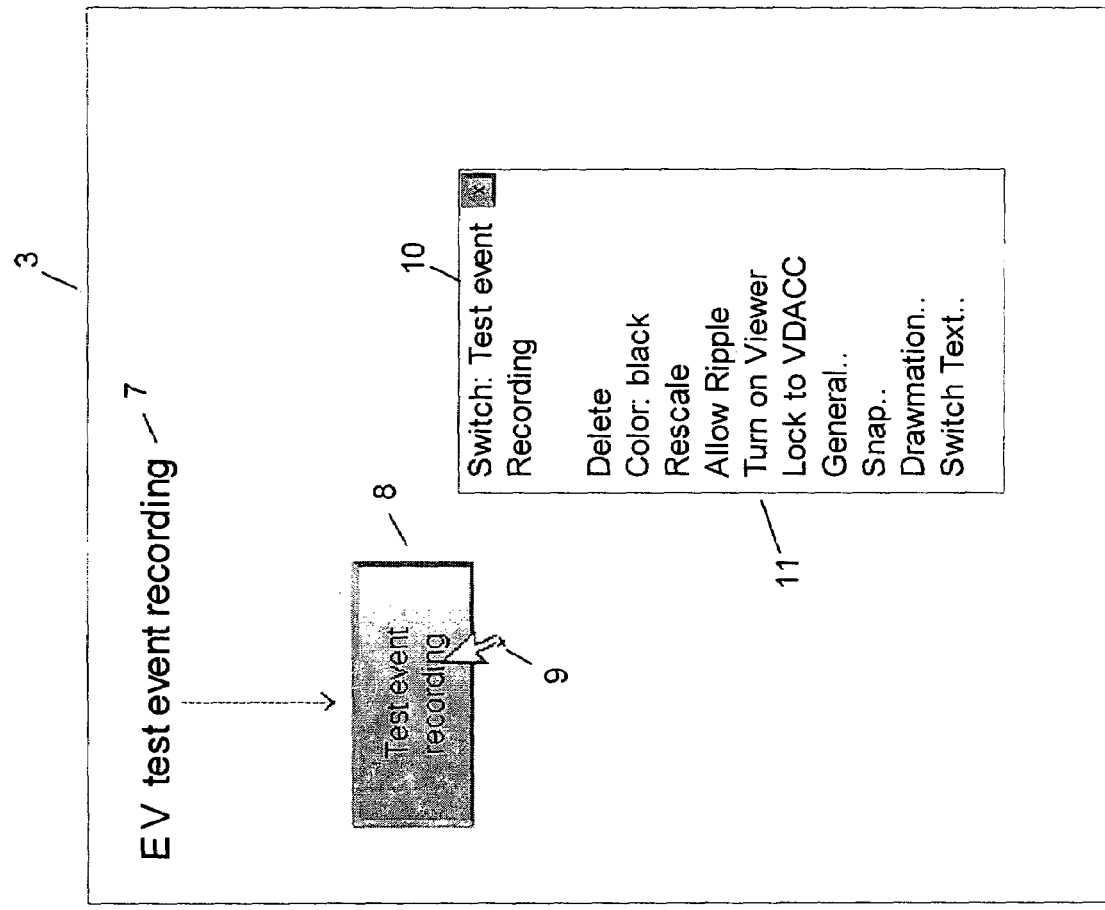
FIG. 4 depicts selecting the viewer in an Info Canvas object.

C. Select an option that causes the playing of an event recording to launch a separate executable as a viewer. This is shown in FIG. 4. The user right-clicks on the mouse or its equivalent with the mouse cursor 9 on the event replay switch 8 and an Info Canvas object 10 appears for the event replay switch. The term "Info Canvas" is a trademark of NBOR Corporation. The Info Canvas object 10 for the event replay switch 8 provides entries to change the properties of the switch or control functions associated with the event replay switch. Thus, the Info Canvas object 10 serves as a menu for using the event replay switch 8. For more information about Info Canvas objects, see simultaneously filed U.S. patent application Ser. No. 10/671,953, entitled "Intuitive Graphic User Interface with Universal Tools", which is incorporated herein by reference. In this Info Canvas object 10, the entry "Turn on Viewer" 11 is activated by clicking on the entry, which selects the option for replaying event sessions in the viewer.

Figure 5:
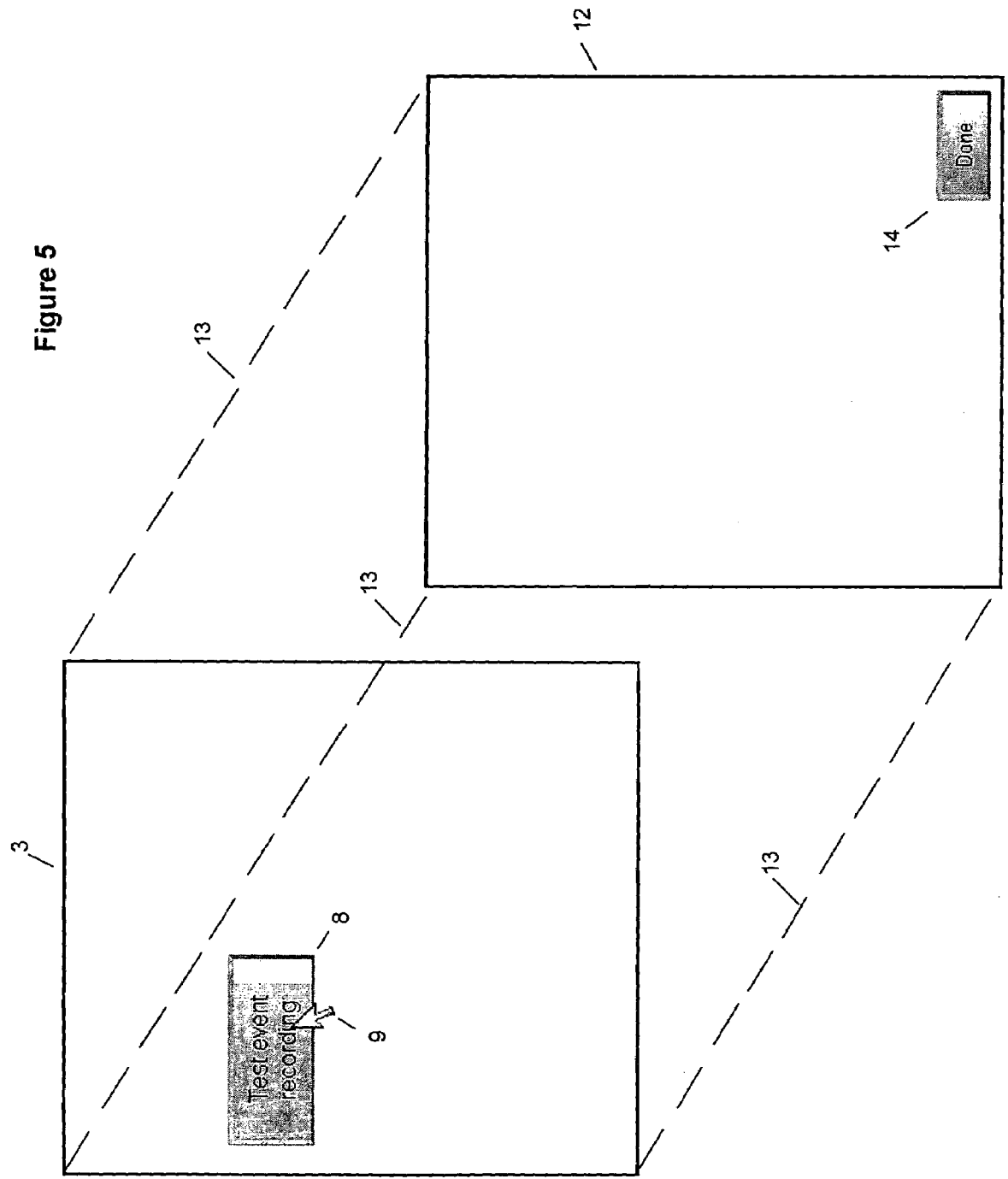
FIG. 5 depicts launching a viewer.

D. Activate the event replay switch. This causes the event session assigned to this switch to be loaded into a Blackspace environment. This is shown in FIG. 5. A user left-clicks or its equivalent with a mouse cursor 9 on an event replay switch 8. If the viewer is turned on in the Info Canvas object for the event replay switch 8, a second executable of the computer program is launched, which causes a second Blackspace environment 12, i.e., the viewer, to be placed directly on top of the Blackspace environment 3 in which the event replay switch 8 was activated. This is shown by the dashed lines 13. Once the viewer is launched, the user sees one version of the Blackspace environment 12. In this environment 12, the event session replays. At any time the user can stop this replay and operate the computer program via the Blackspace environment 12. If the user chooses not to stop the replay, when the replay finishes, another switch (e.g., a "done" switch 14 shown in FIG. 5) is automatically placed in the viewer. The user can then activate this switch to return to the original Blackspace environment 3. In this case, the viewer 12 disappears. When a user activates the event replay switch 8 again, the viewer 12 reappears and the event session is again replayed in the viewer and so on.

Summary: The replaying of an event session can be executed in either a user's local executable or it can be executed in an additional executable (the viewer), which is launched when the replay is initiated. Replaying of an event session in a separate executable ensures that the replaying will not intrude on a user's current work space—the current executable that is open in which that user is working.

When a user enters the event browser 4, which is shown in FIG. 3, any listed event session can be selected. This selection can be made by double clicking on a mouse button, entering a verbal command or other equivalent command. When the event session is selected, the event session is automatically assigned to an event replay switch 8, as shown in FIG. 3. When this switch 8 is depressed to activate it, the event recorder looks to see if the user's system has been configured to play event sessions either locally (playing the event session in the original Blackspace environment) or remotely (using a viewer in a second executable to play the event session). If configured to play event sessions remotely, then the event recorder launches a new executable 12 (which is a separate copy of the same code the user is currently operating), as shown in FIG. 5. Then by means of a socket connection between the two running executables, the event recorder will load the event session into the second executable and then start playing that event session in that executable.

This second application (executable) 12 is brought to the foreground such that its Blackspace environment is placed over the current Blackspace environment 3 so that only the second Blackspace can be seen, as shown in FIG. 5. The user can then view operations in the new Blackspace environment 12 that have been previously recorded using the event recorder, for example, to illustrate to the user how to operate the Blackspace application or program.

When the end of the event session is reached, a switch 14 appears in the Blackspace environment 12 of the viewer, as shown in FIG. 5. This switch 14 may have a label on it, such as "Done." Any label can be used and users can customize the label of the switch 14 as they choose. Upon touching or activating this switch 14, the user can navigate back to the original Blackspace environment 3 where the user was when the user initiated the replay of the event session in the first place. When this switch 14 is touched, the viewer disappears and the Blackspace environment 3 of the first executable is no longer obscured by the Blackspace environment 12 of the second executable. Now the user again only sees the first Blackspace environment 3 and the user can then continue to work without any further interruption. When the user activates another event replay switch or the same replay 8, the viewer is again activated, which launches another executable of the computer program and places a new Blackspace environment over the first Blackspace environment 3 where the user can view the associated event session and operate the computer program without affecting any setups or operations that exist in the first Blackspace environment and so on.

2. Initial Conditions.

When a user requests an event session to be recorded, the entire system state of the current Blackspace environment is saved as a set of initial conditions. This means that the event recording can start from any system state. The event recording does not have to start from a default system state, for instance with a blank screen, which would be a fairly common default state for a number of existing software applications.

Using the event recorder in accordance with the invention, the system can be configured to be however a user wants it. Items, devices, and conditions for those devices and items can be present onscreen and saved as a set of initial conditions. The advantage of saving a set of initial conditions as the starting point for an event recording is that the computer program only has to record the interaction with the system that the user cares about. The computer program does not need to show the previous steps as to how the system was configured to reach the current state.

This enables a manufacturer, company or the like to provide help structures with individual event replay switches located throughout the help disclosures. This eliminates the need to have large numbers of animations accounted for in the help structure. These animations may be very difficult for the user to navigate through and will undoubtedly take up a lot of hard disk space or its equivalent. With the event recorder in accordance with the invention, each individual piece of information, description and/or explanation contained in the help disclosures can have its own event recording. Each event recording can then be accessed by touching a single switch of any size, which can be located directly in the descriptive text or in any diagram.

The additional hard disk space required for the operation of hundreds of event recordings is negligible. The use of event replay switches enables anyone creating a help structure or wishing to communicate anything in a Blackspace environment to anyone else to break the information a user want to impart to anyone into smaller sized chunks. A separate event recording and initial conditions file can easily be created to communicate each piece of information. These pieces of information can be presented in any order and users can reorder them at will by moving the event replay switches to new locations within any electronic document in which these switches appear. Simply put, each event recording can be operated as an independent entity with no relationship to any other event recording.

This is in strong contrast to a conventional help system as found in existing software programs. For instance, if one were going to show three different sets of operations in a conventional help system using screen captures, video or graphics in a document, each of the three things would be recorded or illustrated one after the other and then replayed one after the other. So if a user is only interested in the last piece of information, the user will have to either watch the previous two pieces of information or be forced to navigate through the previous information to find the information that the user wants.

With the ability to save initial conditions, the event recorder in accordance with the invention can be used to setup three different operations independently and assign each operation to separate event replay switches so that the user can access the three different operations at random.

3. Embedding of Event Recordings in Normal Working Documents.

FIG. 6 shows the placement of event replay switches into an electronic document. Because the computer program has the ability to assign event sessions to graphical switches 8a, 8b and 8c (switches that are graphical objects in the Blackspace environment), users can place these switches 8a, 8b and 8c anywhere within the user's working environment—anywhere within the Blackspace environment. Therefore, users can embed event sessions anywhere they want in their working environment. One method of embedding an event session in an electronic document would be to place a first switch 8a into a text document by first recalling the event session as described above with reference to FIG. 3. Then the event replay switch 8a is dragged to a desired location in a text document, as shown in FIG. 6. Then a second event switch 8b is recalled and dragged to a second location and so on. This document could be in the Blackspace canvas or in a VDACC object. The term "VDACC" is a trademark of NBOR Corporation. A VDACC object includes a workspace surface or canvas that may be larger than the visible or viewable area of the VDACC object. Thus, the VDACC object allows a user to scroll the visible area to view graphic objects or contents in the VDACC object that were hidden from the visible area. For more information about VDACC objects, see simultaneously filed U.S. patent application Ser. No. 10/671,953, entitled "Intuitive Graphic User Interface with Universal Tools".

Each of these event replay switches 8a, 8b and 8c has an event session assigned to it. The replaying of any event session represented by any event replay switch embedded in a text document can be accomplished by touching that event switch. The event session called forth by activating any embedded event switch can be played in either the original Blackspace environment (the same environment where the user operates the embedded event replay switches) or in a viewer. Multiple copies of the same event replay switch can exist in the same document for convenience.

4. Editing Initial Conditions and Operations.

The initial conditions file is saved as a normal log file. A log file is a snapshot of the system state. A log file saves complete definitions of every control in the system. It contains sufficient information to recreate all of these controls and the state of all the contexts in the Blackspace environment. Because the initial conditions file is saved as a normal log file, it means that a user can open an initial conditions file and edit it just like it was a normal working environment. The edited initial conditions file can then be saved for subsequent use.

The initial conditions file is completely editable. This does carry a condition of its own in that if the initial conditions file is changed, such as the locations of the graphic items that are being moved in the event session, then the location of the mouse button presses must be moved accordingly in the event session file or the event session will not play back accurately.

The editing of event sessions provides great flexibility to, for example, translate the text portion of an initial conditions file to a foreign language. Any piece of text in an initial conditions file can be changed to another piece of text, e.g., translated into another language. Thus, multiple versions of the same event session can be created in multiple languages.

Additionally, there is the option of changing images that are in the initial conditions file for appropriate target audiences. In some instances, for example, in showing event recordings to children, the use of cartoons may be desired. Then the same event recording could have the cartoons replaced with photographs for young adults, etc.

Being able to edit the initial conditions file for an event recording provides the ability to tailor the initial state independently of the recording, which will then be performed on the initial state.

Figure 7:
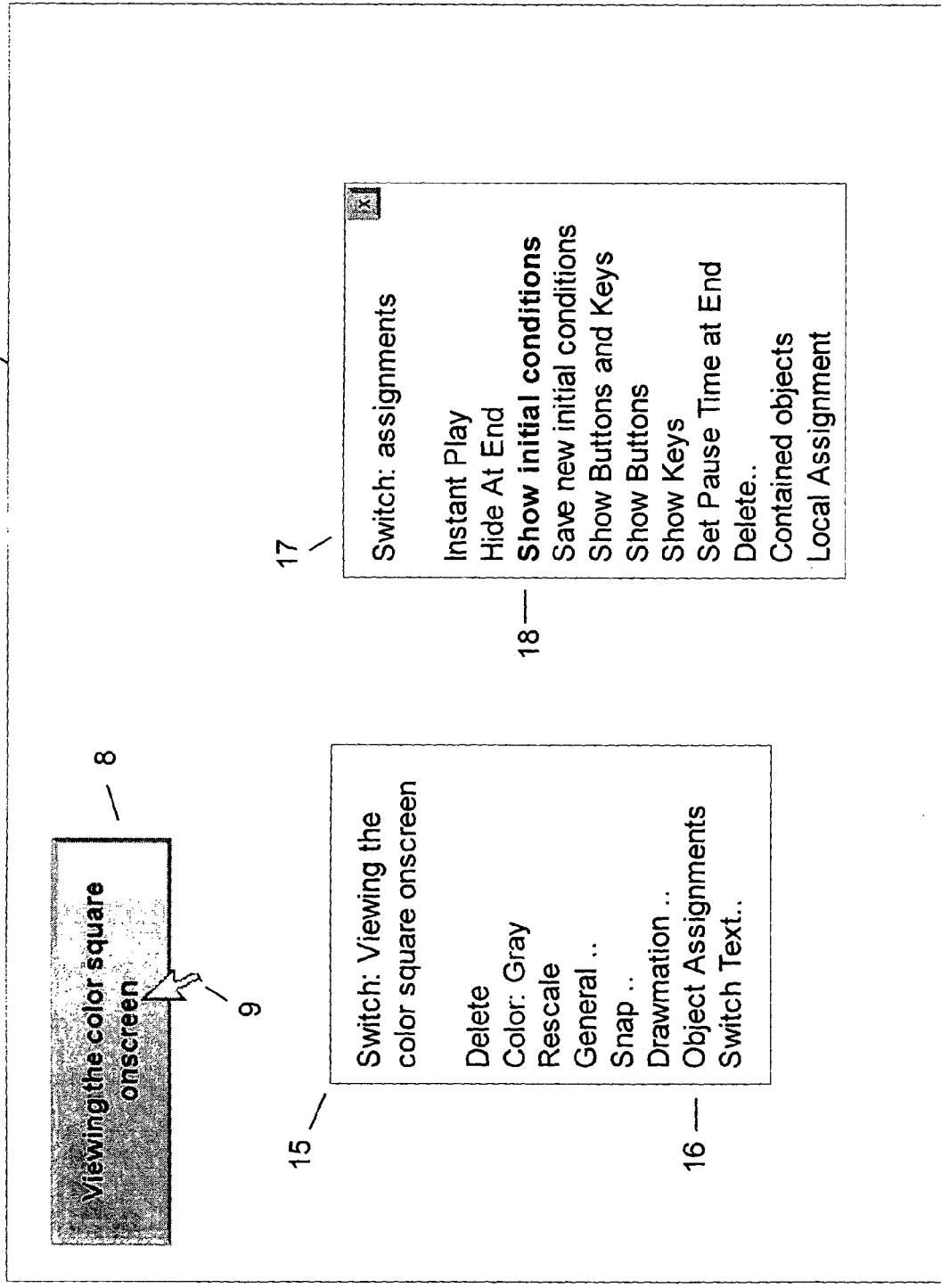
FIG. 7 depicts how to view the initial conditions for an event recording.

To edit an initial conditions file, a user needs to first view the initial conditions for an event session. There are various methods to view the initial conditions for an event session. One method would be to use a verbal command like "show initial conditions." Another method is to use the Info Canvas object for an event replay switch that has been assigned to an event session, as shown in FIG. 7. The steps of this method are as follows. A user would right click on the mouse with a mouse cursor 9 on an event replay switch 8. This will cause an Info Canvas object 15 for this event replay switch 8 to appear onscreen. Then, in this Info Canvas object 15, the mouse cursor 9 would be left-clicked on the category "Object Assignments" 16. This would in turn cause the Info Canvas object 17 for the category "Object Assignments" 16 to appear. In this Info Canvas object 17, the user would left click on the entry "Show initial conditions" 18. This would cause all of the graphics, pictures, devices, etc., that were visible in the Blackspace environment when the event recording assigned to the event replay switch 8, now entitled "Viewing the color square onscreen," was created to be shown.

Figure 8:
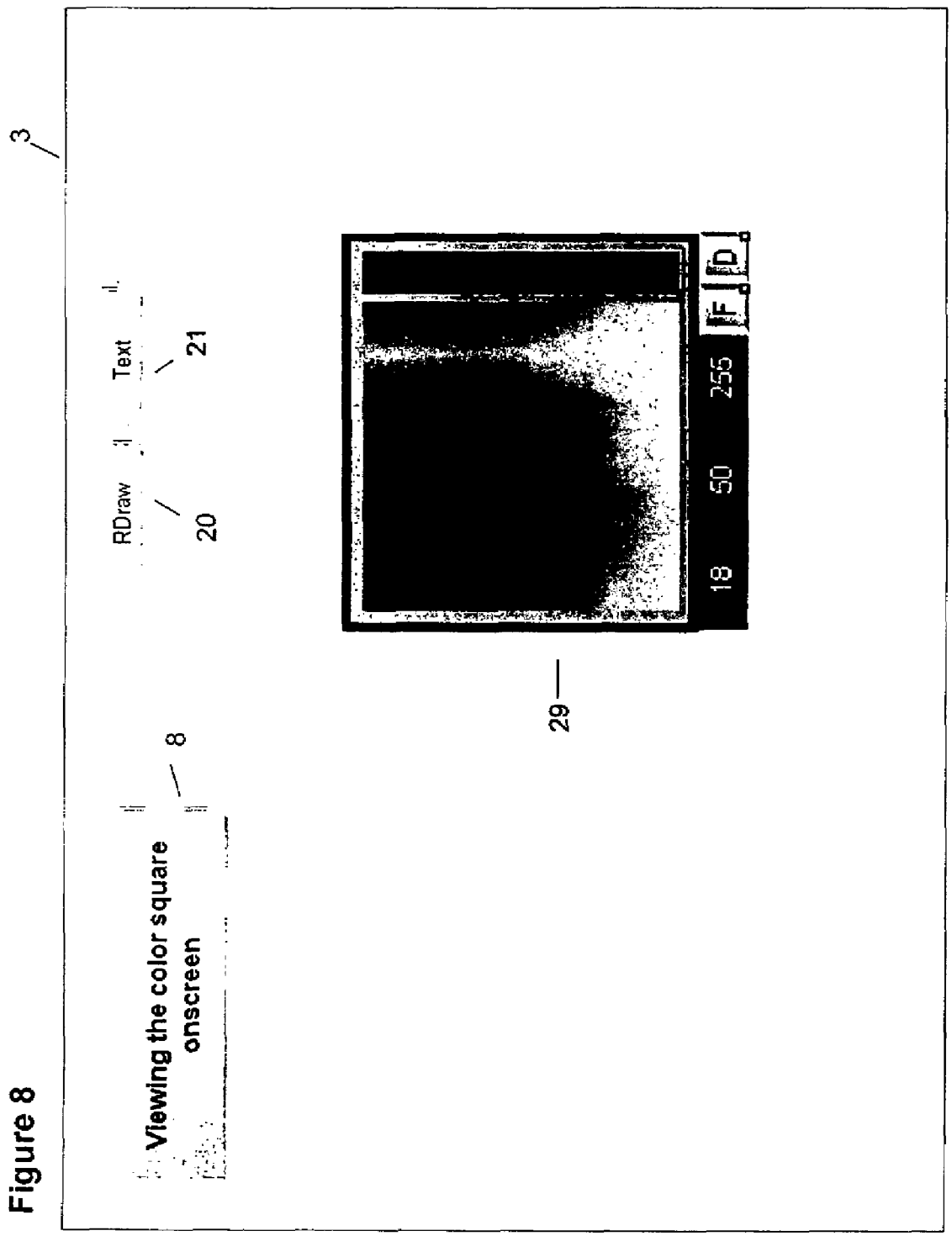
FIG. 8 depicts an example of initial conditioners for an event recording.

What happens when this entry "Show initial conditions" 18 is activated, which may be achieved by left-clicking, by a verbal command or any equivalent command, is that the Info Canvas objects 15 and 17 disappear and are replaced with the items contained in the initial conditions file saved with the event session file entitled: "Viewing the color square onscreen", as shown in FIG. 8. This figure shows the initial conditions for the event session "Viewing the color square onscreen." The initial conditions consist of the Free Draw inkwell 29, the RDraw switch 20 and the Text switch 21. The event replay switch 8 is not part of the initial conditions file and is automatically excluded by the computer program. All other items visible onscreen are contained (saved) within the initial conditions file.

Figure 9:
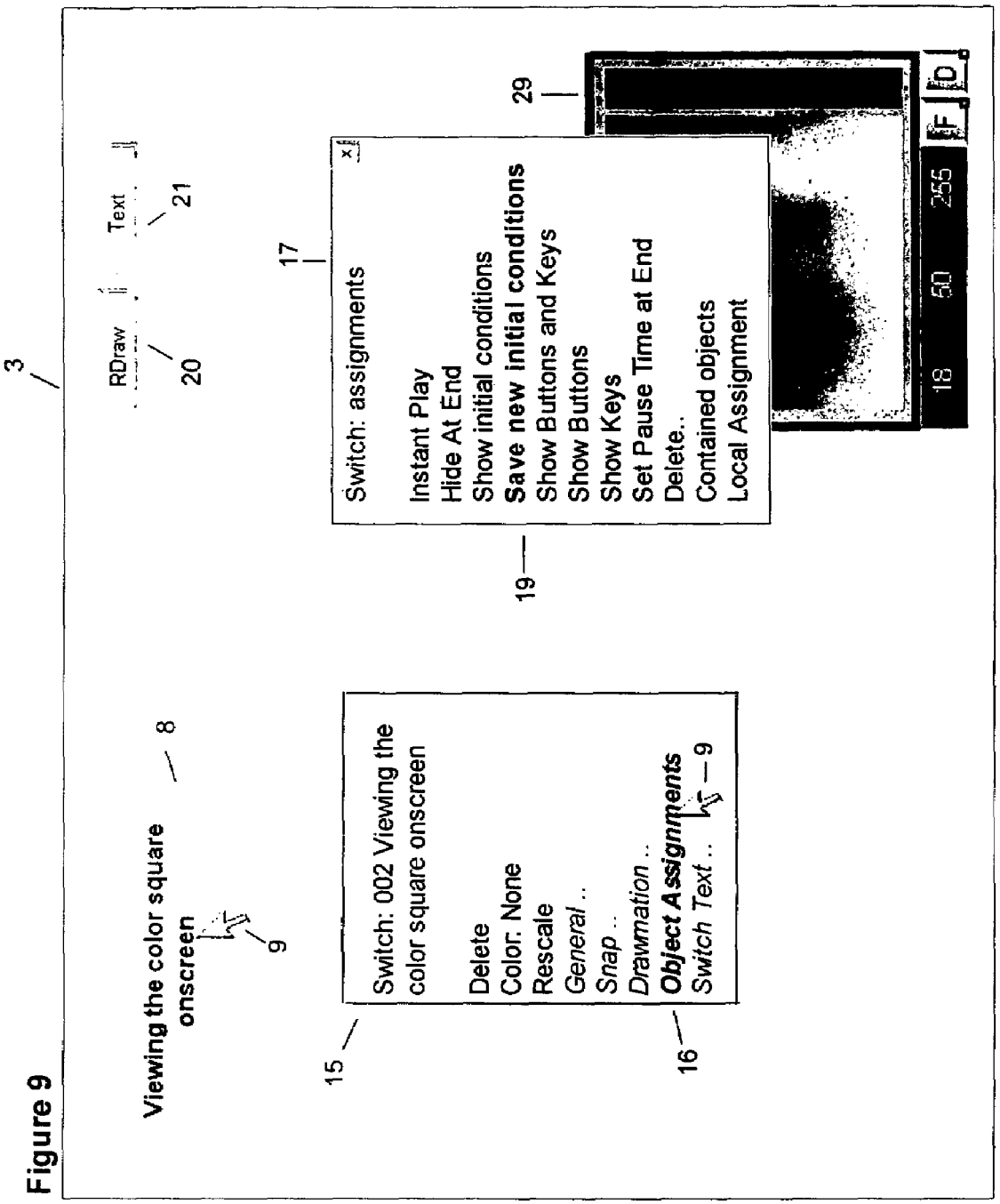
FIG. 9 depicts a first method of editing initial conditions.

If a user wishes to edit this initial conditions file, many choices are available. One choice is shown in FIG. 9. This choice is to simply move any object shown onscreen, and then go again to the Info Canvas object 17 and select the entry entitled: "Save new initial conditions" 19 by left-clicking with the mouse cursor 9. This will update the initial conditions file for the current event session, in this case, "Viewing the color square onscreen." In FIG. 9, the Free Draw Inkwell 29 has been moved to a new location.

Figure 10B:
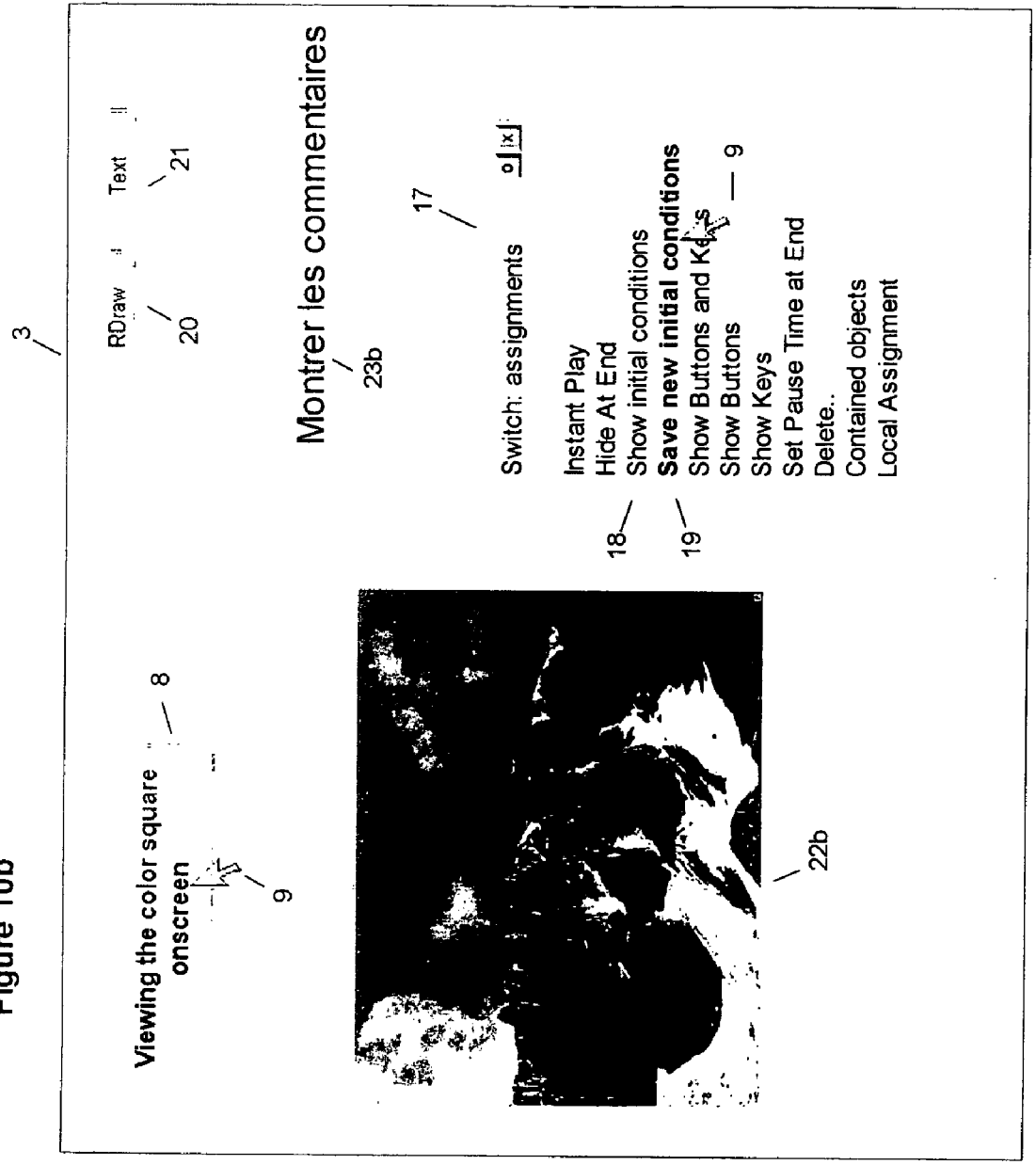

FIG. 10a shows a Blackspace environment 3 that includes a text object 23a and a picture 22a. FIG. 10b shows the same Blackspace environment 3 in which the text object 23a has been replaced by a French translation 23b. The original text 23a was retyped as text 23b. In addition, the picture 22a has been replaced by the picture 22b. One method to replace this picture 22a is to delete the picture and recall a new picture 22b and then drag this new picture to the same approximate location as the first picture. To save this new initial conditions, the entry "Save new initial conditions" 19 is selected in the Info Canvas 17.

5. Event Recording is the Real Computer Program Operating on Itself. The Event Recorder is Integrated into the Computer Program, e.g., the Blackspace Program.

An event recording is the Blackspace program recording events in the Blackspace environment. The playing back of an event recording is the Blackspace program playing events into the Blackspace environment. Thus, the Blackspace program is operating on itself. This is a completely self-contained recording and playback mechanism with total control over where and when these events get delivered. So the user is not constrained to have the Blackspace environment in any particular physical location because the event recording is just playing events into the Blackspace environment. So the computer program is not dependent upon the physical location of the Blackspace environment on the computer screen because the computer program is sending events back into the Blackspace environment from the Blackspace environment.

There is no dependency on anything outside of the Blackspace environment. Because the computer program is sending events to and from the Blackspace environment, the computer program has more precise control over how those events are delivered.

As described below, the computer program has implicit flow control because the Blackspace program can't deliver the next event until it's finished processing the previous event. Which means the system can automatically scale itself to the performance of the computer in which it is running.

Figure 11:
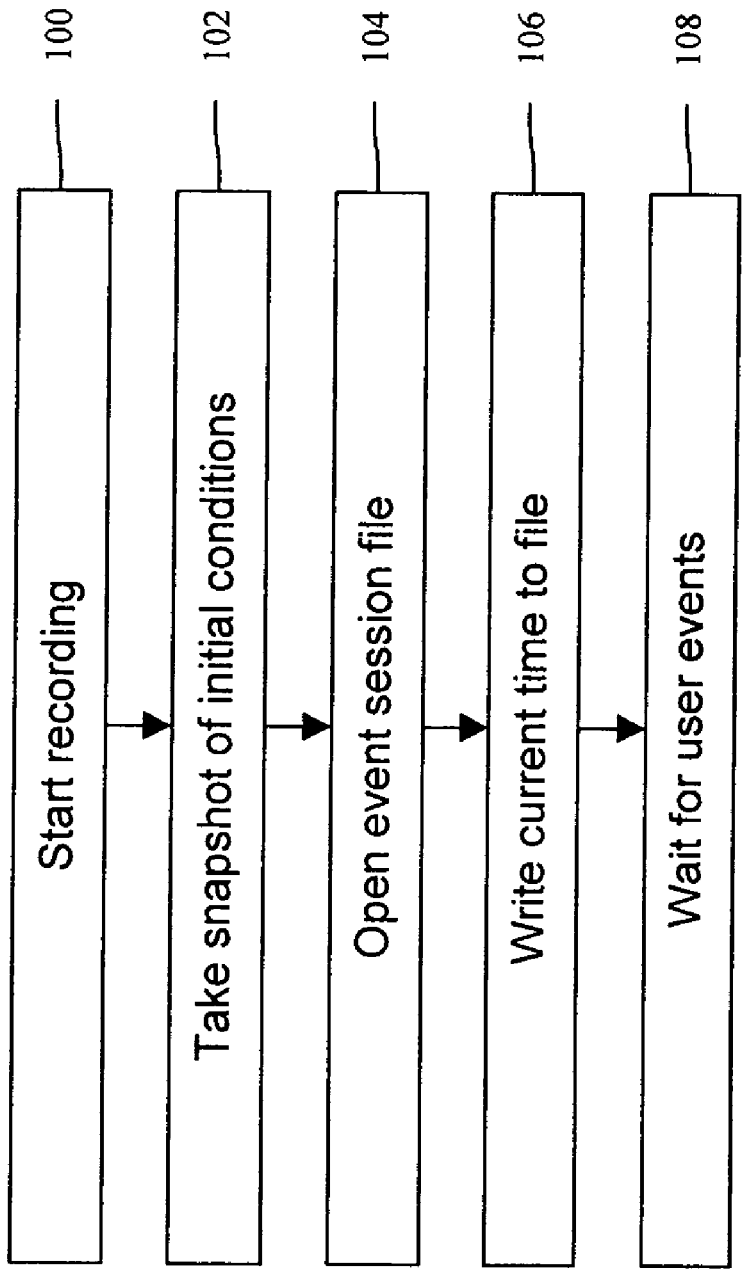
FIG. 11 is a flowchart of a process for recording events in a computer operating environment.

FIG. 11 is a flow chart of a process for recording events in a computer operating environment, e.g., a Blackspace environment, using the event recorder in accordance with the invention. Start Recording 100: A user presses a key or key combination, e.g., the Control (Ctrl) key plus the F2 key, to initiate the start of an event recording. This is the entry point of this flow chart. Then, Take snapshot of initial condition 102. The event recorder saves the state of the system at the point in time that the user initiates start of an event recording, e.g., the user depresses both the Control key and the F2 key.

Then, Open Event Session File 104. The event recorder then opens a file with a temporary name in order to store the forthcoming event session. Then, Write current time to file 106. The event recorder notes the current time and saves this to the file as the first event in the file. The event recorder examines the normal system clock and sees what the current time is and uses that to record a start event in the event session file. This is used to determine the pacing of the subsequent events on replay. This enables the user to record a pause at the beginning of every recording.

Then, Wait for user events 108. The event recorder then waits for the user to create events. Events are mouse presses, mouse releases, mouse drags and keyboard depresses. This summarizes the steps performed when the Control key plus the F2 key are pressed. These steps are conceptually instantaneous.

Figure 12:
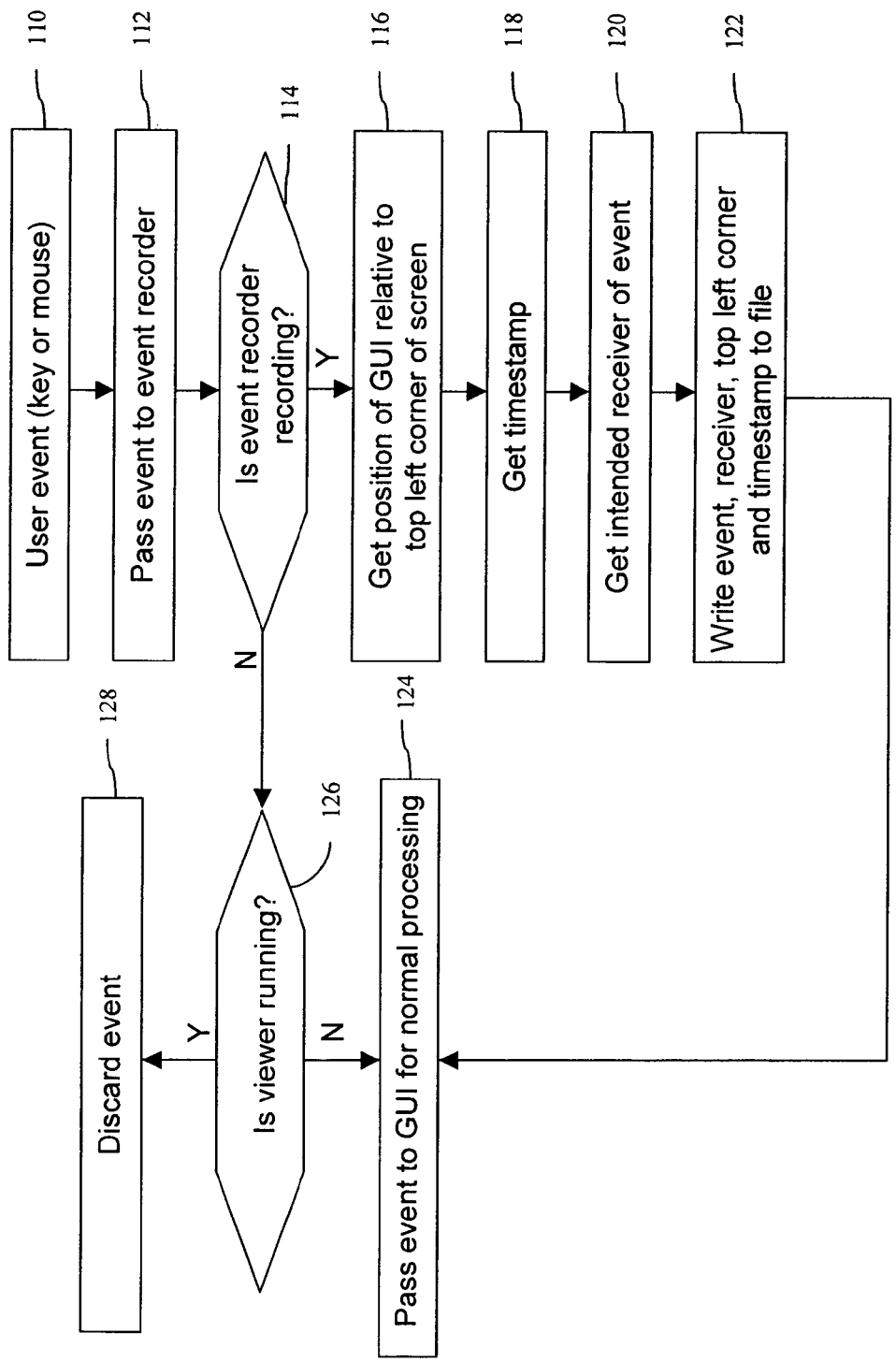
FIG. 12 is a flowchart of a process for handling user events or inputs.

FIG. 12 is a flowchart of a process for handing user events or inputs. User event 110—this can be any mouse interaction or keyboard interaction, e.g., key click, mouse click, etc. At this step, a user creates a mouse press, a mouse release, a mouse drag, or a key press on the computer keyboard.

Then, Pass event to event recorder 112. All incoming user events are handed initially to the event recorder for examination before further processing. Then, Is event recorder recording? 114. If the event recorder is recording, then the event recorder has some additional processing to perform on these events. Taking the yes branch, Get position of GUI relative to top left corner of screen 116. The event recorder calculates the current top left corner of the Blackspace environment relative to the user's physical screen. Then, Get time stamp 118. The event recorder records the current time when the user generated this event. Then, Get intended receiver of event 120. There are a number of different event receivers in the Blackspace environment. The primary event receiver is the Blackspace canvas. Then, Write event, receiver, top left corner and time stamp to file 122. The event recorder creates an entry in the event session file that contains all the listed information. Then, Pass event to GUI for normal processing 124. At this point, the event is passed back to the GUI for normal processing.

Referring again to the step Is the Event Recorder recording? 114, if the event recorder is not recording, then Is Event Recording playing? 126. The event recorder checks to see if the event recorder is playing. If the event recorder is playing, then the event is discarded. If the event recorder is not playing, then the event is passed to the GUI for normal processing.

Figure 13:
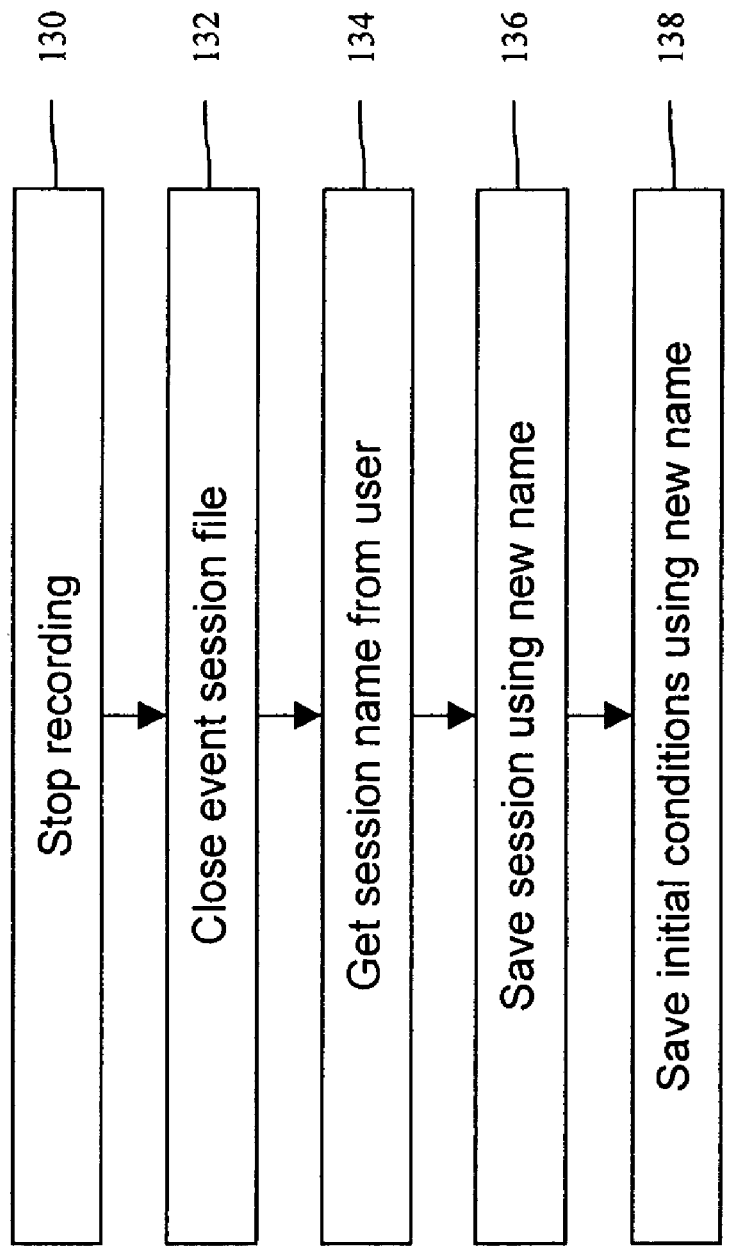
FIG. 13 is a flowchart of a process for stopping an event recording.

FIG. 13 is a flow chart of a process for stopping an event recording. Once the recording process is initiated by a user pressing one or more keys, the recording process is stopped by pressing one or more additional keys. As an example, a user could press the Control key plus the F1 key to terminate the event recording session. That is the point at which this flow chart begins—Stop Recording 130. Then, Close event session file 132. At this point, the event recorder closes the event session file. Then, Get session name from user 134. The computer program prompts the user to name the session. The user enters a session name. Then, Save session using new name 136. This step saves the last recorded event session file to disk under the user's new name. Then, Save initial conditions using new name 138. The same name and the same directory is applied to the initial conditions file that was taken at the start of recording with a different file extension in order to keep the event session file and the initial conditions file in the same place and easily correlated.

An example of the two different file extensions would be as follows; The extension ".evi" is the initial conditions file and the extension ".evs" is the event session file. The initial conditions file contains information about what was present onscreen at the time when the event recording was started, in other words, at the time that the event recorder is activated to record, for example, by holding down the Ctrl key plus the F1 key.

The initial conditions file is a snapshot of the system state at the time the user initiated an event recording. It contains all the information necessary to recreate the Blackspace environment at the beginning of the replaying of an event recording in order to match the recorded mouse events with the state of the system in which the mouse events were created. The initial conditions file is almost identical to a log file that the user can create manually.

The event session file (.evs) is the recording of each mouse press, mouse release, mouse drag and any keyboard presses that occurred after the initiating of the recording process, as described above with reference to FIG. 1, and the stopping of the recording process, as described above with reference to FIG. 3.

Figure 14:
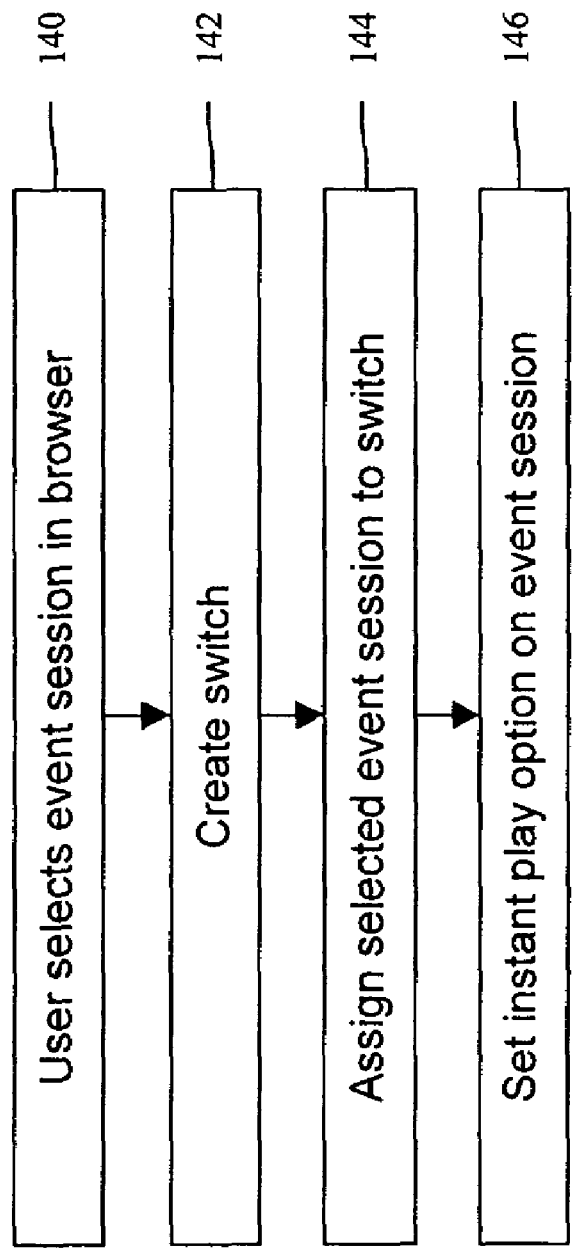
FIG. 14 is a flowchart of a process for loading an event session.

FIG. 14 is a flowchart of a process for loading an event session. User selects event session in browser 140. To recall an event recording, the user can type "EV" and then press the Enter or Escape key, use a verbal command or enter any equivalent command. This brings up a file browser that lists the event sessions previously recorded. The user then navigates through the browser to find the event session the user is interested in and then the user selects the event session in the browser. Then Create switch 142. When one of the entries in the event session browser is selected (e.g., double-clicked on or its equivalent), a switch is automatically created by the computer program. This switch is also labeled with the name of the event entry that was selected in the browser to recall the event recording.

Then, Assign selected event session to switch 144. The event recorder loads the selected event session and assigns this event session to the switch. Then, Set instant play option on event session 146. The event recorder defaults to setting "instant play" on in the event session assigned to a switch. The instant play option means that when the user activates a switch that has an event session assigned to it (e.g., left-clicks on the switch), the event session replays immediately, if the viewer is to be used for replay (the default replay mode). If the viewer is not going to be used to replay an event session and the main application is to be used instead, replay does not start automatically. Since loading the initial conditions overwrites the current state of the system, automatically playing the session in the main application may cause the user to loose valuable work. Instead, as a protection, the user must manually start replay when replaying in the main application in order to prevent inadvertent loss of data. An example of such an initiation of manual replay would be holding down the Control key and depressing the F2 key.

Figure 15:
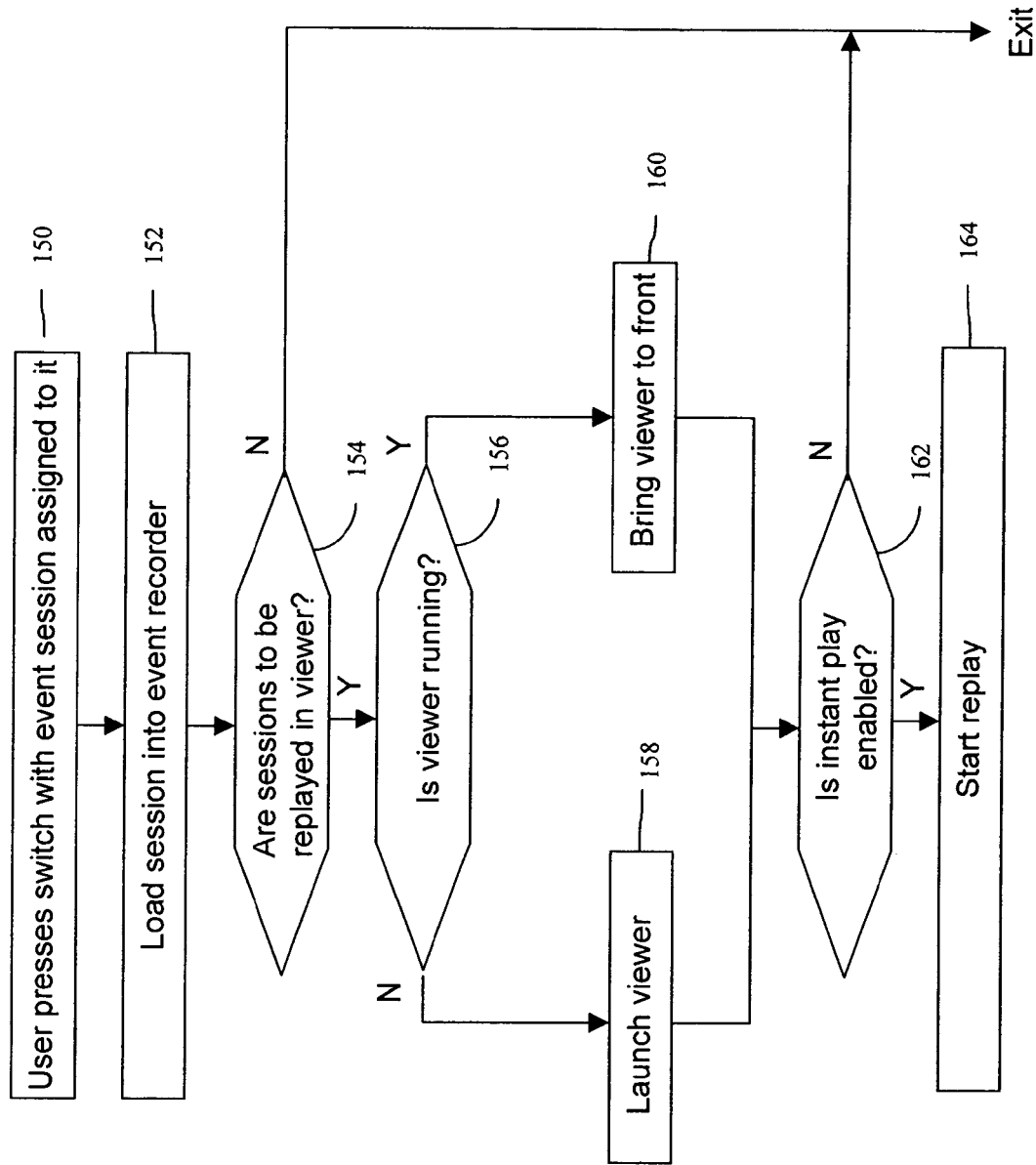
FIG. 15 is a flowchart of a process for launching a viewer to replay an event session.

FIG. 15 is a flow chart of a process for launching a viewer to replay an event session. User presses switch with event session assigned to it 150. A user clicks on a previously created switch that has an event session assigned to it. The switch turns on. Then, Load session into event recorder 152. The event recorder makes the event session assigned to the switch its current event session. Then, Are sessions to be replayed in viewer? 154. The system configuration file can be used to specify whether event sessions are to be replayed in the local application or in a separate viewer application. The viewer application is a separate copy of the same computer program executable, so the viewer application is an identical copy of the code. If the event session is to be played locally, then this terminates the process. If the session is to be played in the viewer, following the yes branch, then, Is viewer running? 156. If the viewer is not running, then Launch viewer 158—viewer is launched. If the viewer is running, then Bring viewer to front 160. The event recorder instructs the viewer via a socket connection to bring itself to the foreground and be on top of all other windows on the screen of the user. Then, Is instant play enabled? 162. If instant play is enabled, then Start replay 164; if not, this terminates the process.

The viewer is another executable. When the computer program (an executable) is started, the file name of the executable that was used and selected by the user is saved. When the event recorder decides to start a viewer, the event recorder uses this same file to create a process using the operating system API. This creates a separate copy of the application using the same executable file. The viewer and the launching application communicate by means of a TCP/IP socket, which is established during initialization of the viewer.

If the user is activating the viewer as part of a dynamic help system, the following is what the user sees. The user is reading a help document that consists in part of text and diagrams (graphics) and event replay switches. Each of the event replay switches can have a separate event recording assigned to it. The placement of an event replay switch may be anywhere, but popular placements of these switches would be at the beginning of a discussion of a particular topic or at the end of this discussion.

Each of these replay switches most likely has a text label that describes the event recording that is assigned to that switch. The user then activates the desired replay switch by a left-click, double-click, verbal command, or the equivalent of any of these. Once the switch is activated, it turns green or some other suitable color to indicate that it has been turned on.

Directly following this, a second executable of the Blackspace program is launched. This second executable causes a second Blackspace window to fly-out onto the top of the existing Blackspace window that contains the dynamic help document where the user activated one of the event replay switches.

This second Blackspace window perfectly matches the shape and location of the first Blackspace window such that the first Blackspace window is obscured. In this second Blackspace window is a Blackspace environment. In this Blackspace environment, a setup of graphics, text, pictures, etc., appears. This "setup" equals the snapshot that was taken as the initial conditions file for the event recording that was assigned to the switch that the user has just activated in the dynamic help.

Then in this Blackspace environment, the user sees the replaying of every action that was recorded in the event recording. The actions may include anything that can be performed in the Blackspace environment. The replaying of these actions is in actuality the Blackspace program playing recorded mouse presses, mouse releases, mouse drags and keyboard presses that were performed during the recording of the event session. The replaying of this event session is in fact the computer program playing itself. It is the computer program being activated by recorded events.

At any time during the replaying of an event recording, the user can stop the replaying of the event recording. At this point in time the user can directly operate the computer program to recreate the actions that have been just viewed by the user via the replaying of the event recording.

The value here is that the computer program is always active. The user is not viewing a video or pre-recorded slide show of actions. The user is viewing the actual code being operated in real time by the event session being replayed. So when the user stops the replaying of the event recording at any point in time, the user can immediately operate the computer program to perform any task that the computer program is capable of performing. These tasks are not limited to the tasks being viewed during the replaying of the event recording.

The computer program is fully active at all times and any task that the computer program is capable of performing can be operated by the user at any point during the replaying of any event recording. The operation of the computer program can take place directly in the viewer, in the second executable, not in the first executable where the dynamic help system is still present and active.

If desired, the user can close the viewer and then operate the computer program in the first executable, or the user can continue to operate the computer program in the viewer. It is the choice of the user. The operation of the computer program is the same for either executable as both are running the same computer program.

Figure 16:
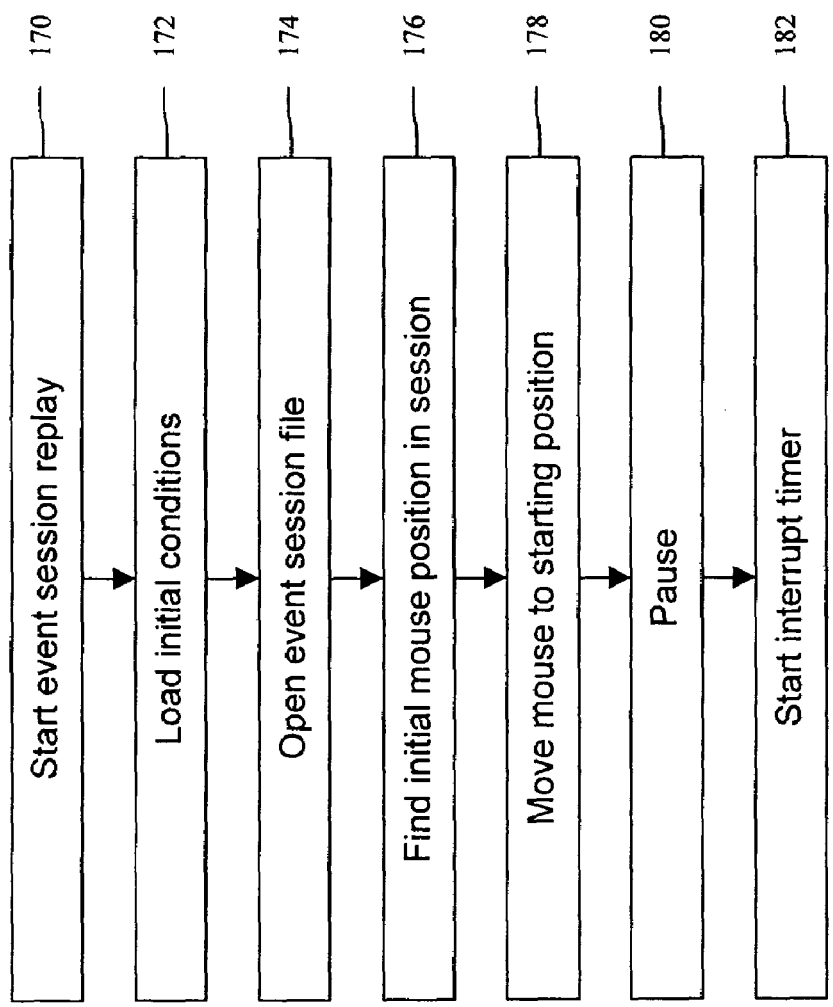
FIG. 16 is a flowchart of a process for replaying an event recording.

FIG. 16 is a flowchart of a process for replaying an event recording. Start event session replay 170. When event sessions are started automatically with instant play or the user starts them manually using both the control key and the F2 key or their equivalent, this process is executed. Then, Load initial conditions 172. The initial conditions file corresponding to the selected event session is loaded into the copy of Blackspace program playing the session, which is either the local application (first executable) or the viewer (second executable). Then, Open event session file 174. The currently selected event session is opened from where the even session is stored, e.g., a hard disk.

Then, Find initial mouse position in session 176. The recently opened event session is read until the first mouse event is encountered. This is used to determine where the mouse was when the user first started the event session recording. Then, Move mouse to starting position 178. The event recorder moves the current mouse cursor from where it currently appears onscreen to the position as specified in the event session file for the beginning of replay. Then, Pause 180. The event recorder pauses for a short period of time in order to indicate to the user that event session replay is about to start. Then, Start interrupt timer 182. The event recorder starts a timer that will provide time interrupts to generate orderly events during replay. What is being replayed is mouse presses, drags, and keyboard strokes referenced to an initial conditions file. The state of this initial conditions file, the types and locations of graphics, text, pictures, video, etc., onscreen directly determines the result of replaying the mouse presses, drags, and keyboard strokes saved during the recording phase of creating an event recording.

Figure 17:
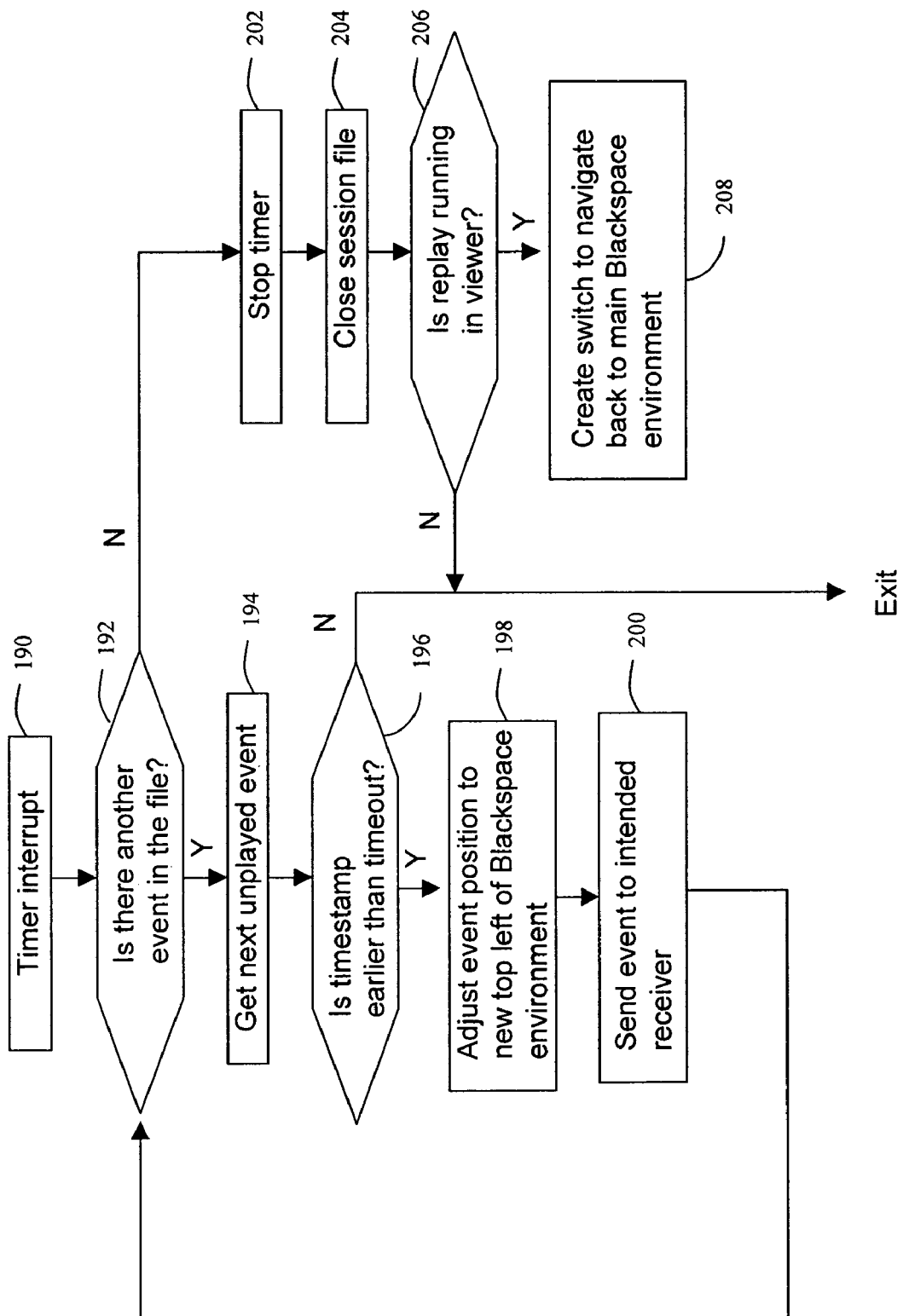
FIG. 17 is a flowchart of a process for performing timer interrupts.

FIG. 17 is a flowchart of a process for performing timer interrupts. Timer interrupt 190. The operating system delivers an interrupt to the event recorder on a specified time interval, e.g., a ten second boundary. This interrupt is used to drive the replay of event sessions. Then, Is there another event in the file? 192. This is the entry point for the main event recorder replay processing loop. Then, if there is another event in the session file, the event recorder takes the yes branch. Then, Get next unplayed event 194. The next event in the session file is read from the file. Then, Is timestamp earlier than timeout? 196. If the timestamp recorded in the file along with the recorded event is later than the time generated by the time interrupt, then there is no processing required for this event at this time. Thus, no branch is taken and the process exits.

If the timestamp is earlier than the timeout, the yes branch is taken. Then, Adjust events position to new top left of Blackspace 198. If the user is replaying an event session in a copy of the Blackspace program, which is in a different physical location on the screen to where the event session was originally recorded, the event recorder adjusts the information retrieved from the event session file to take account of this change in physical position. If the event to be replayed is a mouse event, the mouse cursor is moved to the position, relative to the top left corner of the Blackspace environment, where the cursor originally was when the event was recorded. Therefore, during the replay of the session, the mouse cursor tracks the path of user input giving the appearance that the mouse is driving the system during replay.

Then, Send event to intended receiver 200. The event recorder examines the information retrieved from the event session file to determine which component in the Blackspace environment the event was initially sent to and delivers this event to that receiver. Then, Is there another event in file? 192. The event recorder continues processing around this loop until all events have been read from the file that corresponds to this timer interrupt. Once the file is empty, then Stop timer 202. The event recorder cancels the interrupt timer it started at the beginning of event session replay. Then, Close session file 204.

After the session file is closed, Is replay running in viewer? 206. If not, since the local application is being used to replay event sessions, then there is no further processing required and the process exits. If the replay is running in the viewer, then Create switch to navigate back to main Blackspace 208. The event recorder creates a switch in the bottom right hand corner of the Blackspace environment of the viewer so the user can activate this switch to navigate back to the main Blackspace environment (the first executable) from the viewer (the second executable). When the user clicks on this switch, this puts the viewer into the background and brings the original application into the foreground so it is on top of all other windows on their desktop and the user is ready to continue with their original work.

Another way of creating an event session assigned to a switch is to create a switch manually and then bring up the event session browser by, for example, typing the letters "EV" followed by the Escape key, Enter key or an equivalent command. The user then navigates to find the directory that contains the event session the user is interested in. The user can then draw an arrow, e.g., a yellow arrow, from the event session file in the browser to the switch. When the computer program recognizes the arrow as being a valid arrow logic for this context, the arrowhead changes color, e.g., turns white.

The valid arrow logic in this case is an assignment logic "assigning the object(s) that the arrow's shaft encircles or intersects or is within the gap default of and assigning these items to the object that the arrowhead points to." The context in this case is having an event session in a browser and a switch outside the browser. NOTE: the arrowhead may not change color but instead change its state, e.g., start flashing or pulsating or become animated in some other fashion, or there could be a combination of color change and a change of state. For more information regarding arrow logic and context, see pending U.S. patent application Ser. No. 09/880,397, entitled "Arrow Logic System for Creating and Operating Control Systems", filed on Jun. 12, 2001, which is incorporated herein by reference.

Clicking on the white arrowhead in the arrow assigns the event session to the switch that the arrowhead is pointing to. The user is then able to label this switch as desired and not necessarily with the file name that is shown in the browser. This switch can be saved as part of a normal log file such that, after recalling the log file, the switch can be clicked on to launch an event session.

The key features of the event recorder in accordance with the invention are:

i. The event recorder is an integrated tool.
ii. The event replay does not need to start from a fixed default state
iii. Event replay can be stopped at any point and the user can carry on working with the current state of the application that replayed the event session
iv. The initial conditions can be edited after the event session has been recorded
v. Event sessions are handled like other media types in the Blackspace environment.

Event recorder has a self throttling mechanism to adjust its processor loading to better match the capabilities of any computer's processor, especially computers that have processors with more limited capacities. The operating system cannot deliver an event to the Blackspace program until it has finished processing the previous event. Therefore, the rate at which the Blackspace program consumes events (e.g. during a mouse movement when dragging an object) is determined by the speed at which the Blackspace program can process these events. This speed is reflected in the timing of events recorded in the event session. On replay, the event recorder uses the recorded timing to determine when events should be delivered to the Blackspace program. When replaying the event session, with the Blackspace program running on a slower machine than that which was used when recording the event session, the event recorder is unable to deliver events to the Blackspace program at the recorded rate because the processing for each event takes longer and the event recorder is unable to deliver events to the Blackspace program until the previous event has been processed. When running on a faster machine, the event recorder waits until the recorded time has elapsed before delivering the event to the Blackspace program. This ensures that the session replays no faster than when it was recorded, but on slower machines all recorded events are processed in sequence so no information is lost.

Figure 18:
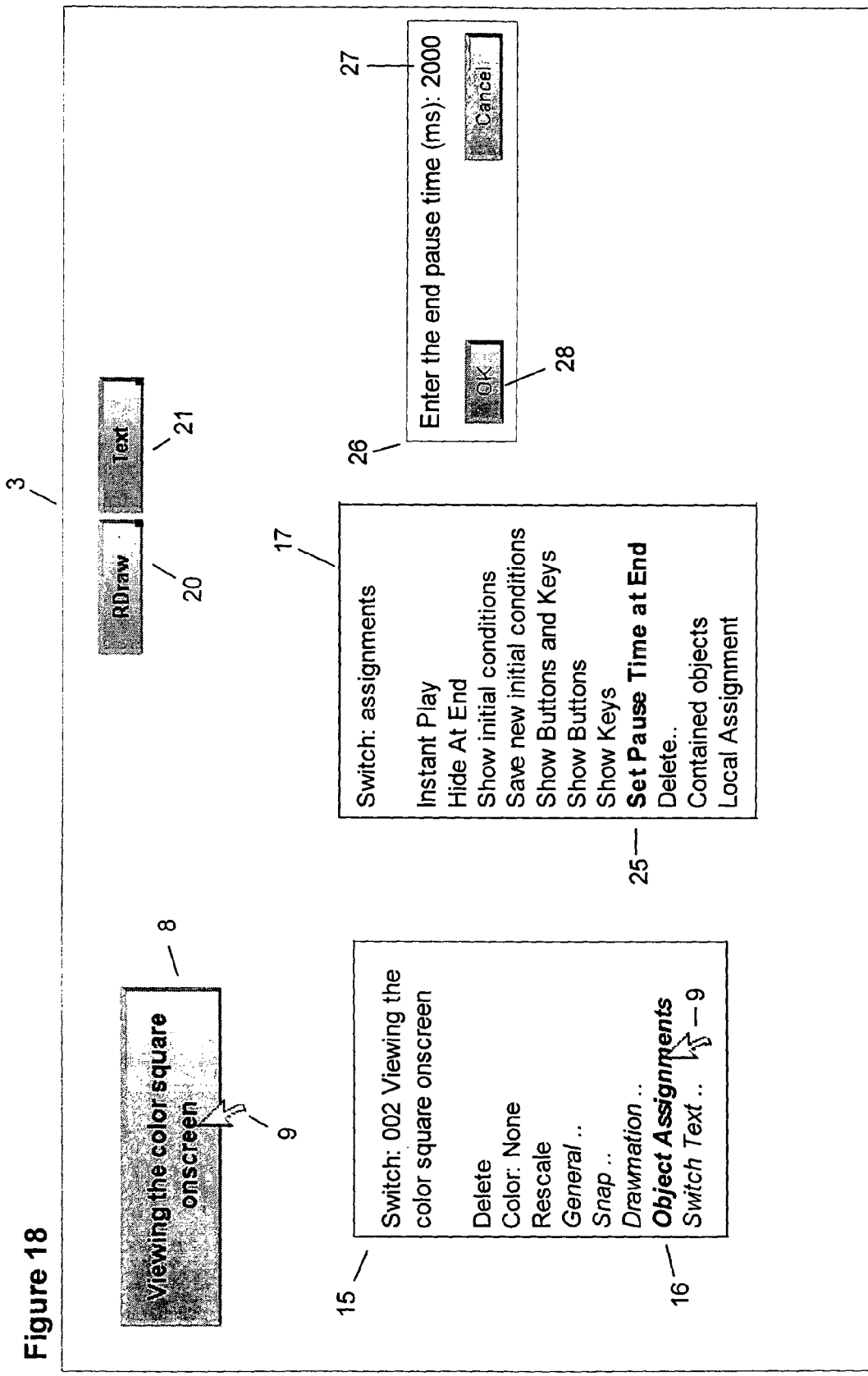
FIG. 18 shows how to adjust the end time of an event session.

Adjusting the time at the end of an event session. If a user creates an event recording that includes extra time at the end of the event session that is not needed, the user can remove this extra time. Referring to FIG. 18, extra time at the end of an event session can be removed by selecting the category "Object Assignments" 16 in the Info Canvas object 15 and then selecting the entry "Set Pause Time at End" 25 in the Info Canvas object 17. The selection of each category and/or entry in the various Info Canvas objects may be accomplished by left-clicking with the mouse cursor 9. When entry "Set Pause Time at End" 25 is selected, a pop up VDACC object 26 appears enabling a user to enter a pause time. There are various methods of changing this time. One method would be to place a text cursor in the numerical parameter 27, then type a new or modified parameter, and then activate the "OK" switch 28. This event session pause time is defined as the time added to the last mouse up-click in the event recording.

Figure 19:
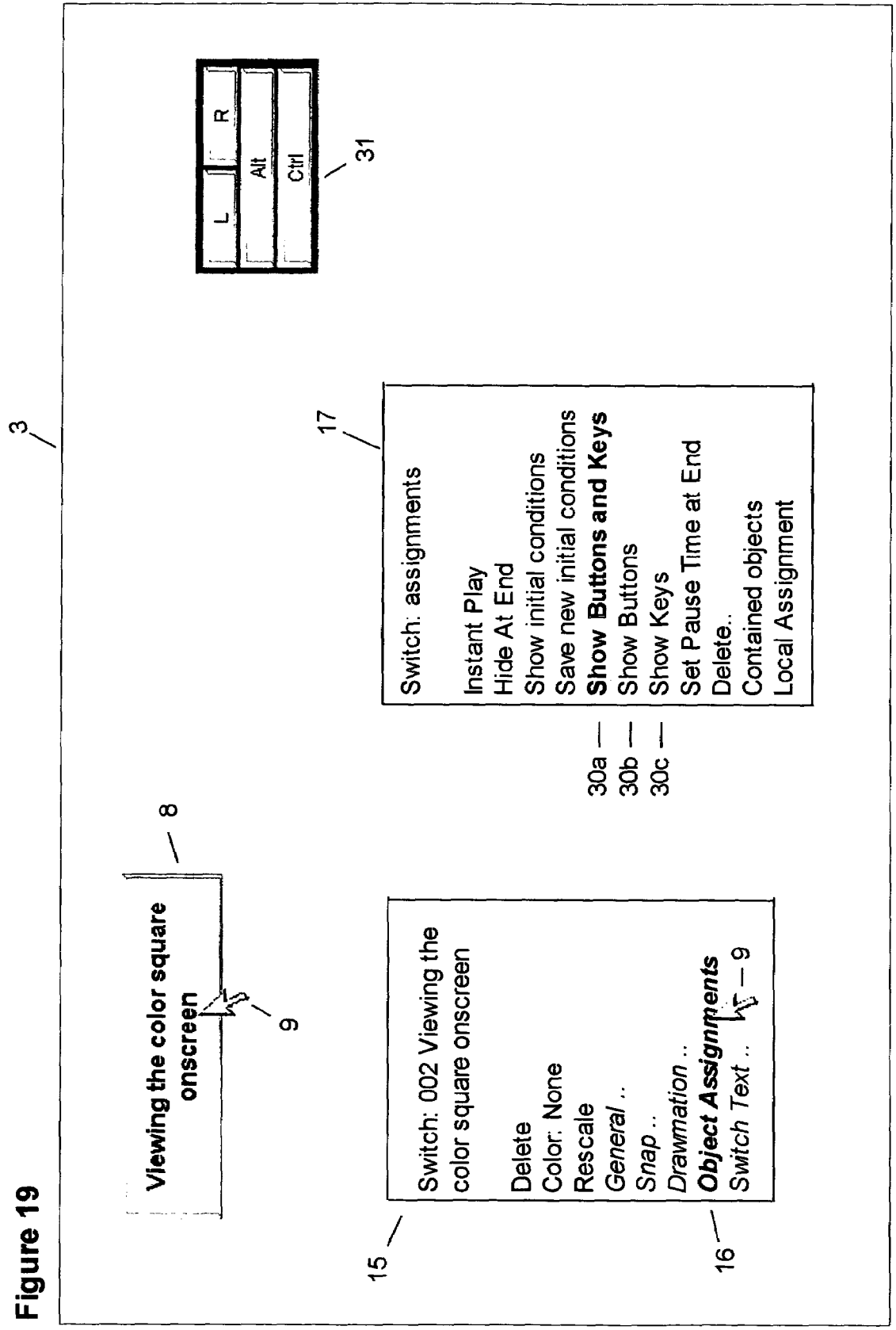
FIG. 19 shows how to add a special VDACC object for illustrating mouse presses and key presses to an event session.

Showing of buttons and keys. A user can add to any event recording special VDACC objects that includes graphic representations of mouse buttons to illustrate mouse presses and releases for left and right button clicks. The special VDACC objects may also include graphic representations of certain keystrokes on the computer keyboard to illustrate these keystrokes. Examples of these would be the Control key, the Alt key and the Command key, the Shift key, etc. Such a VDACC object 31 is shown in FIG. 19. The operation of this VDACC object 31 is controlled by the mouse presses, releases and keystrokes that are saved as events in a given event session. To add this special VDACC object 31 to an event session, a user may left-click on the entry 30a, which makes the special VDACC object to appear. Then, the user can drag the VDACC object 31 to any desired location onscreen. If a special VDACC object showing only the L and R switches is desired, then the user may select entry 30b, which makes such special VDACC object to appear. If a special VDACC showing only the Alt and Control key is desired, the user may select the entry 30c, which makes such special VDACC object to appear. Any combination of switches can be provided for by modifying the entries in the Info Canvas object 17 or by adding more entries.

Mouse presses and their subsequent releases can be moved after they have been recorded as events in an event session. The process for moving the recorded mouse presses and their subsequent releases is as follows. First a user left clicks on an event switch to start the replaying of an event session. Then the user presses the Ctrl key plus the F3 key or their equivalents before the mouse press occurs that the user wishes to move to a new location. Then, the user presses the Control key plus the F4 key. This tells the system that the user wishes to move the next mouse press, replaying in the event session, to a new location. Then the user left-clicks in the Blackspace environment at the new location point.

The event recorder determines the position and timing of the mouse click to replace, as well as the speed of the mouse movement before and after this click. The event recorder replaces the mouse moves before and after the mouse click, as well as the mouse click itself. The speed of the mouse movement is used in the new mouse moves. In addition, the pauses before and after the replaced mouse moves are maintained. Finally, the timing of all subsequent events in the session is adjusted to take account of the different path taken by the mouse. The user can repeat this process any number of times in order to replace multiple mouse events in the session.

When a user clicks in the Blackspace environment at a new location point to change a mouse press, several different possibilities exist. One possibility is that the computer program could immediately update the event session with the new location of the mouse click and then, when this session is played back, the mouse will click in the new location as determined by the user. A second possibility is that the computer program could save the new click location and wait for the event session to continue its replay. At this point, a user could repeat the operation and change the mouse click position of another mouse press and so on.

Another part of this process can be that the computer program immediately makes a backup of the event session, the .evs file, when the Control key plus F4 key are pressed or when the user clicks to indicate a new location for next occurring mouse press in the event session. The backup is automatically labeled with a default name. Furthermore, in this case, the computer program can place a "done" switch onscreen so that a user can click on this switch and exit the replay operation or the replay in the viewer, whichever may be the case.

Socket Communications

After the main application starts the slave application (a second executed version of the computer program), it creates a socket, which the slave connects to. The main application specifies that this second copy should run as a viewer. As a viewer, the application connects to the main application on a predetermined port. Once communication or connection has been established, the main application sends messages across the socket to control the viewer. The viewer acknowledges these messages, again using the socket, in order to synchronize the combined behavior of the main application and the viewer.

When starting the viewer or bringing the viewer to the foreground, the main application sends the coordinates of its top left corner (or their equivalent) to the viewer. The viewer then positions itself such that its own top left corner or equivalent exactly matches that of the main application, thereby placing itself exactly over the main application.

Figure 20:
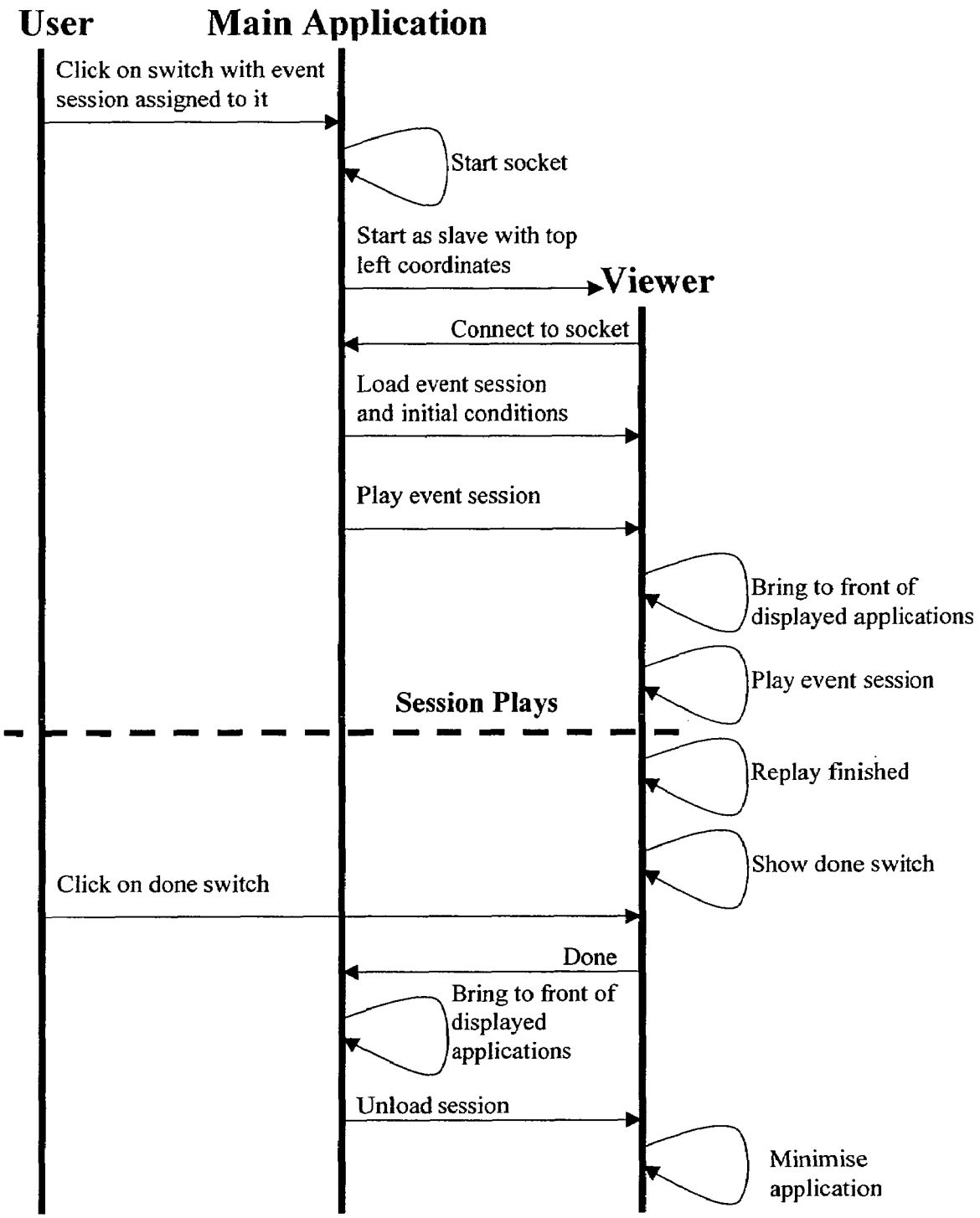
FIG. 20 shows the messages passed between the main application and the viewer when playing an event session in the viewer.

FIG. 20 shows the messages passed between the main application and the viewer when playing an event session in the viewer. In this example, the viewer is initially not running and the event session assigned to a switch in the main application is configured to "instant play". In addition, some elements of the event replay processing, which are described above, are shown to more clearly identify when certain messages are sent and received.

When the user clicks on the switch, the Blackspace program informs any objects assigned to the switch that the switch has been pressed. In this example, an event session has been assigned to the switch. Pressing the switch with an event session assigned to it causes that session to be loaded by the event recorder.

When a session is loaded into the event recorder, the event recorder examines the system configuration to determine if event sessions should be replayed in the main application or in a separate viewer application. In this example, the system is configured to play event sessions in a viewer.

The event recorder calculates the coordinates of the top left corner of the main application. The event recorder then creates a listening socket in order to receive incoming connection requests. The event recorder starts a second copy of the main application, passing parameters on the command line to identify where the copy should position itself and what the function of the copy is. In this case, the event recorder specifies that the copy of the application should operate as a viewer for the event recorder.

When the viewer starts up, it examines any command line parameters. When started as a viewer, the application will receive top left coordinates and a flag indicating its behaviour. The viewer moves the top left corner of the Blackspace environment to the coordinates passed to it on the command line. When started as a viewer, the application opens a socket connection and connects to the main application that is waiting for the viewer to connect.

Once the connection has been established between the main application and the viewer, the main application sends a message to the viewer instructing it to load the event session assigned to the switch the user clicked on. In this example, "instant play" is enabled so the main application sends another message to the viewer instructing it to play the session.

On receipt of the load message, the viewer loads the event session in exactly the same way as if the main application were loading the session to play locally. On receipt of the play message, the viewer brings itself to the top of the user's display so it is above all the other currently open applications. Replay then commences in exactly the same way as if the main application were playing the session locally.

When replay stops, the viewer creates a switch, which, when pressed, indicates that the user has finished with the viewer. When the user clicks on the switch to indicate that the user wishes to return to the main application, the viewer sends a done message to the main application.

On receipt of the done message, the main application brings itself to the top of the user's display so it is above all the other currently open applications. The main application then sends a message to the viewer instructing it to unload the event session.

On receipt of the unload message, the viewer minimises itself and then unloads the event session in exactly the same way as if the main application were unloading the session locally. The user is now able to continue working in the main application. The viewer is dormant, awaiting requests from the main application to load and play another session for the user.

Figure 21:
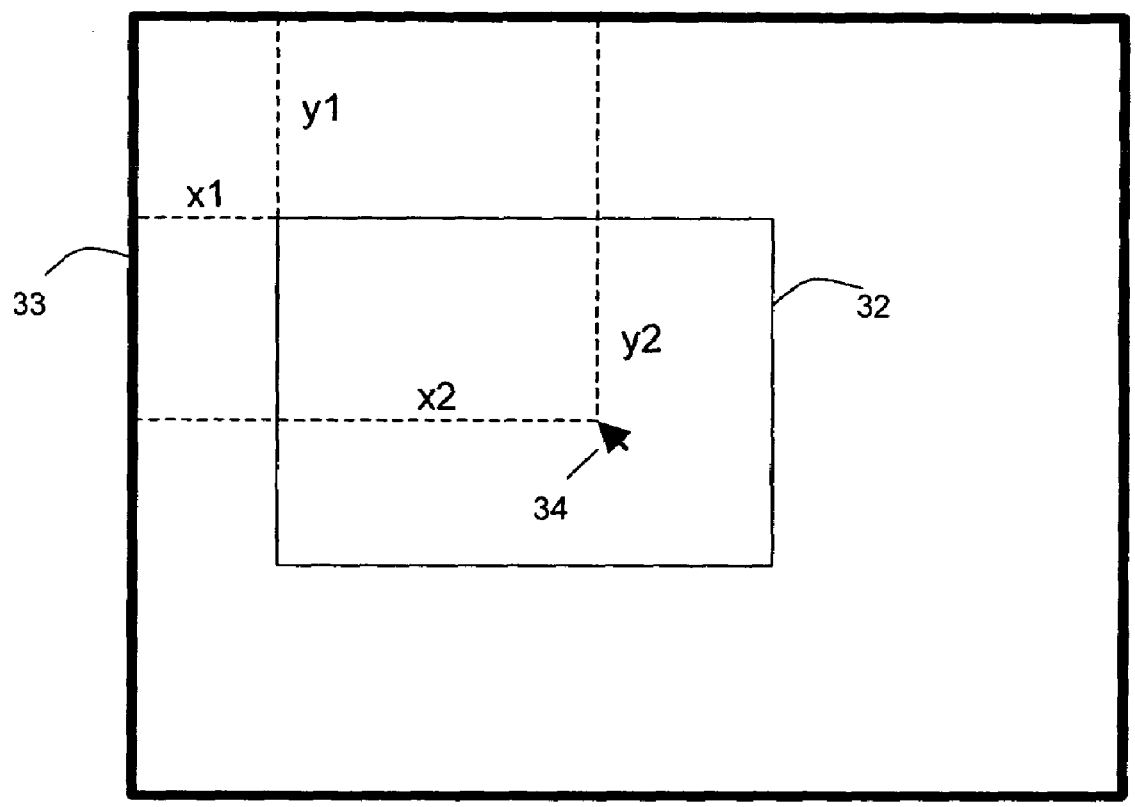
FIG. 21 shows the coordinates used by the event recorder to determine the position of a mouse cursor.

FIG. 21 shows the coordinates used by the event recorder to determine the position of a cursor. The operating system delivers mouse events to the Blackspace program with the position of the click point, relative to the top left corner of the display. The click point is the single point in the mouse cursor that the operating system uses to determine the exact position of mouse events (e.g. the point of the arrow cursor). The Blackspace program translates this position into coordinates relative to the top left corner of the widget that the mouse cursor is on top of. NOTE: the top left point could be replaced with any other point in the Blackspace environment.

In FIG. 21, the point (x1, y1) is the top left corner of the Blackspace environment 32, relative to the top left corner of the display 33. The point (x2, y2) is the position of the click point represented by the mouse cursor 34, relative to the top left corner of the display 33. The results of mouse operation in the Blackspace environment 32 are determined by calculating the position of the click point, relative to the top left corner of the Blackspace environment. This is the delta obtained by subtracting (x1, y1) from (x2, y2). The event recorder records the mouse event (containing the delta position and the display position) and the top left corner of the Blackspace environment 32, relative to the top left corner of the display 33. On replay, the event recorder uses the current top left position of the Blackspace environment, relative to the top left corner of the display 33, to adjusted the display coordinates saved with the event to reflect the current position of the Blackspace environment, as if the event was delivered by the operating system, instead of by the event recorder. This ensures that the system cannot distinguish between events generated by the operating system and events generated by the event recorder.

Figure 22:
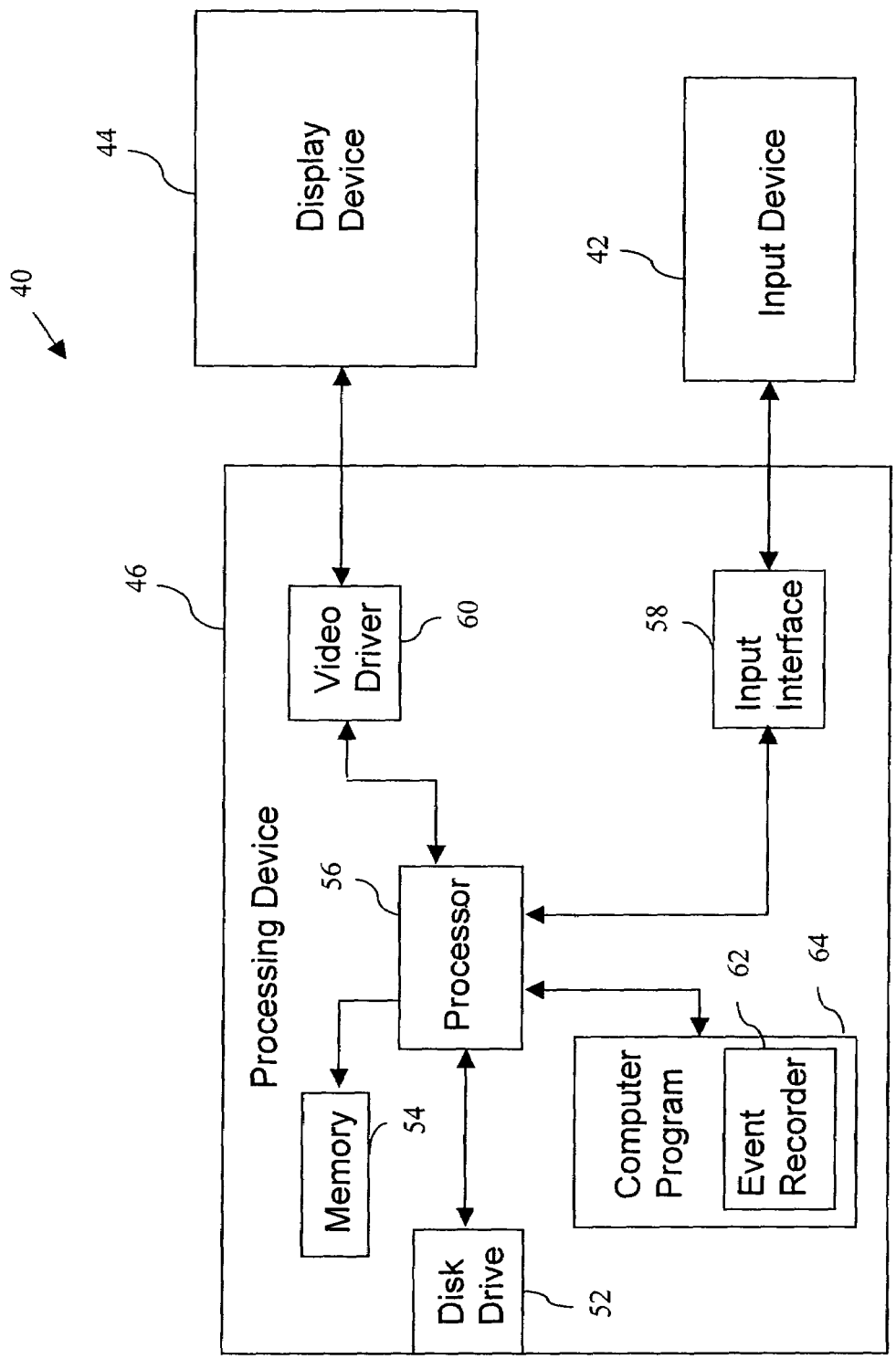
FIG. 22 is a diagram of a computer system in which the event recorder in accordance with an embodiment of the invention is implemented.

Turning now to FIG. 22, a computer system 40 in which the event recorder in accordance with an embodiment of the invention has been implemented is shown. The computer system 40 may be a personal computer, a personal digital assistant (PDA) or any computing system with a display device. In the exemplary embodiment, the event recorder may be embodied in a computer readable storage medium, such as a CD, that includes instructions, which can be executed by the computer system 40, to implement the event recorder in the system.

As illustrated in FIG. 22, the computer system 40 includes an input device 42, a display device 44 and a processing device 46. Although these devices are shown as separate devices, two or more of these devices may be integrated together. The input device 42 allows a user to input commands into the system 40 to, for example, record and/or replay event recordings. In the exemplary embodiment, the input device 42 includes a computer keyboard 48 and a mouse 50, as shown in FIG. 22. However, the input device 42 may be any type of electronic input device, such as buttons, dials, levers and/or switches on the processing device 46. Alternative, the input device 42 may be part of the display device 44 as a touch-sensitive display that allows a user to input commands using a stylus. The display device 44 may be any type of a display device, such as those commonly found in personal computer systems, e.g., CRT monitors or LCD monitors.

The processing device 46 of the computer system 40 includes a disk drive 52, memory 54, a processor 56, an input interface 58, and a video driver 60. The processing device 46 further includes the event recorder 62. As shown in FIG. 22, the event recorder 62 may be implemented as part of a computer program 64, e.g., a Blackspace program that provides the Blackspace operating environment. In the exemplary embodiment, the event recorder 62 is implemented as software. However, the event recorder 62 may be implemented in any combination of hardware, firmware and/or software.

The disk drive 52, the memory 54, the processor 56, the input interface 58 and the video driver 60 are components that are commonly found in personal computers. The disk drive 52 provides a means to input data and to install programs into the system 40 from an external computer readable storage medium. As an example, the disk drive 52 may a CD drive to read data contained therein. The memory 54 is a storage medium to store various data utilized by the computer system 40. The memory may be a hard disk drive, read-only memory (ROM) or other forms of memory. The processor 56 may be any type of digital signal processor that can run the computer program 64, including the event recorder 62. The input interface 58 provides an interface between the processing device 46 and the input device 42. The video driver 60 drives the display device 44. In order to simplify the figure, additional components that are commonly found in a processing device of a personal computer system are not shown or described.

Figure 23:
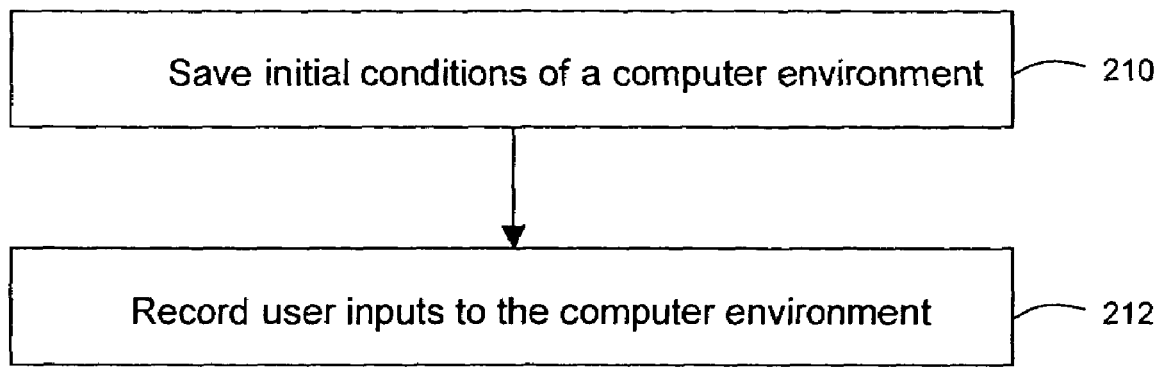
FIG. 23 is a flowchart of a method for recording operations in a computer operating environment in accordance with an embodiment of the invention.

A method for recording operations in a computer environment in accordance with an embodiment of the invention is described with reference to a flow diagram of FIG. 23. At block 210, initial conditions of the computer environment is saved. The initial conditions correspond to an initial state of the computer environment, e.g., a Blackspace environment. Next, at block 212, user inputs to the computer environment are recorded to produce a recorded session of the operations in the computer environment.

Figure 24:
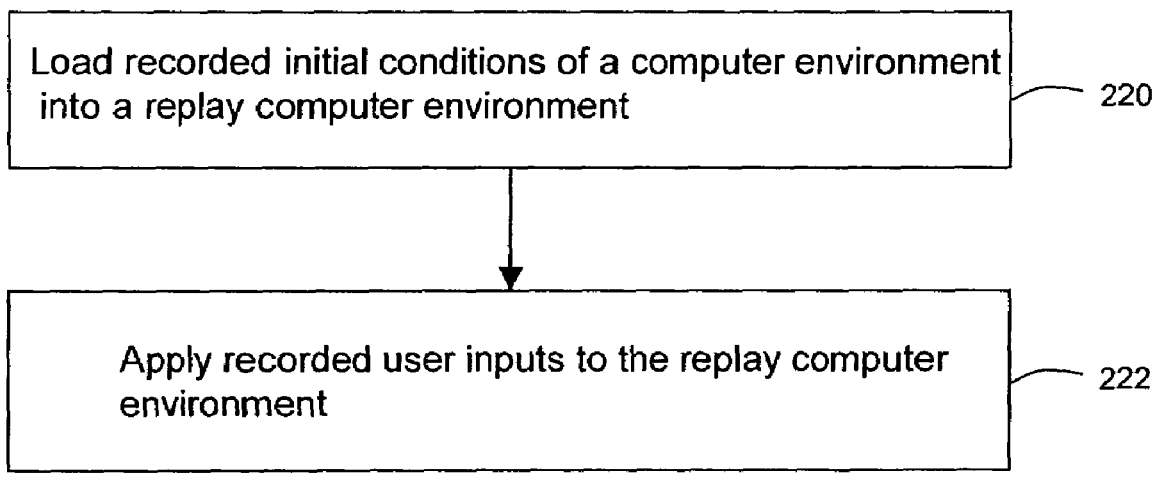
FIG. 24 is a flowchart of a method for replaying recorded computer operations in accordance with an embodiment of the invention.

A method for replaying recorded computer operations in accordance with an embodiment of the invention is described with reference to a flow diagram of FIG. 24. At block 220, recorded initial conditions of a recorded computer environment are loaded into a replay computer environment. As a result, the state of the replay computer environment becomes substantially equivalent to an initial state of the recorded computer environment when the recorded computer operations were recorded. Next, at block 222, recorded user inputs are applied to the replay computer environment, which is now in the state that is substantially equivalent to the initial state of the recorded computer environment. The recorded user inputs actively operate the replay computer environment as a replay of the recorded computer operations initial conditions of the computer environment is saved.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for recording and replaying operations in a computer environment, said method comprising:
   automatically saving initial conditions of said computer environment in a log file when a recording is initiated, said initial conditions corresponding to an initial state of said computer environment such that said initial state of said computer environment can be automatically recreated on replay using said initial conditions, said initial state being a particular state from a plurality of possible states for said computer environment, said log file including complete definitions of every control in said computer environment with respect to said initial state so that said initial state can be subsequently recreated using said log file;
   recording user inputs to said computer environment to produce a recorded session of said operations in said computer environment;
   modifying said initial conditions in said log file in response to user editing of said log file so that a modified initial state of said computer environment is automatically created on replay using modified initial conditions in said log file when said log file is loaded;
   automatically loading said log file in a replay computer environment when a replay is initiated to create said modified initial state in said replay computer environment as a staffing state for said replay; and
   applying said user inputs that were recorded during said recorded session to said replay computer environment to actively operate said replay computer environment to perform said operations that were recorded in said replay computer environment.

2. The method of claim 1 wherein said recording includes saving positional changes of a cursor in said computer environment.

3. The method of claim 1 wherein said automatically saving includes automatically saving said initial conditions of said computer environment in a first computer file, and wherein said recording includes saving said user inputs to said computer environment in a second computer file.

4. The method of claim 1 wherein said recording includes recording positional information of said user inputs in said computer environment relative to a screen on which said computer environment is being displayed.

5. The method of claim 1 wherein said recording includes recording timing information of said user inputs.

6. The method of claim 1 further comprising editing said user inputs to said computer environment after said user inputs have been saved.

7. The method of claim 6 wherein said editing said user inputs includes editing moving one or more mouse events after said mouse events have been recorded as some of said user inputs independent of said initial conditions.

8. The method of claim 1 further comprising:
   assigning said recorded session to a graphic control device such that said recorded session is replayed when said graphic control device is activated.

9. The method of claim 1 further comprising creating said replay computer environment as a copy of a current computer environment from which replay of said recorded session has been initiated.

10. The method of claim 9 wherein said creating includes positioning said replay computer environment over said current computer environment.

11. The method of claim 9 wherein said creating comprises:
creating a connection for said replay computer environment;
establishing said connection between said replay computer environment and said current computer environment on a predetermined port;
sending messages across said connection from said current computer environment to said replay computer environment to control said replay computer environment; and
sending acknowledgement across said connection from said replay computer environment to said current computer environment to synchronize behaviors of said replay computer environment and said current computer environment.

12. The method of claim 1 further comprising selectively delaying said user inputs applied to said replay computer environment such that each of said user inputs is processed before a subsequent user input of said user inputs can be processed.

13. The method of claim 1 wherein said applying includes applying recorded positional changes of a cursor.

14. The method of claim 1 further comprising displaying a graphic representation of a control device to illustrate one or more of said recorded user inputs.

15. The method of claim 1 wherein said modifying includes editing one or more graphic items in said computer environment independent of said user inputs to modify said initial state of said computer environment.

16. A storage medium readable by a computer, tangibly embodying a program of instructions executable by said computer to perform method steps for recording and replaying operations in a computer environment, said method steps comprising:
automatically saving initial conditions of said computer environment in a log file when a recording is initiated, said initial conditions corresponding to an initial state of said computer environment such that said initial state of said computer environment can be automatically recreated on replay using said initial conditions, said initial state being a particular state from a plurality of possible states for said computer environment, said log file including complete definitions of every control in said computer environment with respect to said initial state so that said initial state can be subsequently recreated using said log file;
recording user inputs to said computer environment to produce a recorded session of said operations in said computer environment;
modifying said initial conditions in said log file in response to user editing of said log file so that a modified initial state of said computer environment is automatically created on replay using modified initial conditions in said log file when said log file is loaded;
automatically loading said log file in a replay computer environment when a replay is initiated to create said modified initial state in said replay computer environment as a starting state for said replay; and
applying said user inputs that were recorded during said recorded session to said replay computer environment to actively operate said replay computer environment to perform said operations that were recorded in said replay computer environment.

17. The storage medium of claim 16 wherein said recording includes saving positional changes of a cursor in said computer environment.

18. The storage medium of claim 16 wherein said automatically saving includes automatically saving said initial conditions of said computer environment in a first computer file, wherein said recording includes saving said user inputs to said computer environment in a second computer file.

19. The storage medium of claim 16 wherein said recording includes recording positional information of said user inputs in said computer environment relative to a screen on which said computer environment is being displayed.

20. The storage medium of claim 16 wherein said recording includes recording timing information of said user inputs.

21. The storage medium of claim 16 further comprising editing said user inputs to said computer environment after said user inputs have been saved.

22. The storage medium of claim 16 further comprising:
assigning said recorded session to a graphic control device such that said recorded session is replayed when said graphic control device is activated.

23. The storage medium of claim 16 further comprising creating said replay computer environment as a copy of a current computer environment from which replay of said recorded session has been initiated.

24. The storage medium of claim 23 wherein said creating includes positioning said replay computer environment over said current computer environment.

25. The storage medium of claim 16 further comprising selectively delaying said user inputs applied to said replay computer environment such that each of said user inputs is processed before a subsequent user input of said user inputs can be processed.

26. The storage medium of claim 16 wherein said applying includes applying recorded positional changes of a cursor.

27. The storage medium of claim 16 further comprising displaying a graphic representation of a control device to illustrate one or more of said recorded user inputs.

* * * * *